United States Patent
Matsuzaki et al.

(10) Patent No.: US 6,963,644 B1
(45) Date of Patent: Nov. 8, 2005

(54) MULTI-WORD ARITHMETIC DEVICE FOR FASTER COMPUTATION OF CRYPTOSYSTEM CALCULATIONS

(75) Inventors: Natsume Matsuzaki, Monou (JP); Yasuo Okumura, Moriguchi (JP); Takatoshi Ono, Aichi-ken (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/544,069

(22) Filed: Apr. 6, 2000

(30) Foreign Application Priority Data

Apr. 7, 1999 (JP) .................................. 11-099657

(51) Int. Cl.[7] .............................. G06F 7/00; G06F 7/38
(52) U.S. Cl. ........................ 380/30; 708/490; 708/492; 380/28
(58) Field of Search .................... 380/30, 28; 708/490, 708/492

(56) References Cited

U.S. PATENT DOCUMENTS

| | | | | |
|---|---|---|---|---|
| 5,414,651 A | * | 5/1995 | Kessels | 708/491 |
| 6,026,421 A | * | 2/2000 | Sabin et al. | 708/523 |
| 6,049,815 A | * | 4/2000 | Lambert et al. | 708/492 |
| 6,252,959 B1 | * | 6/2001 | Paar et al. | 380/28 |

* cited by examiner

Primary Examiner—Matthew Smithers

(57) ABSTRACT

A multi-word arithmetic device, capable of executing a variety of types of multi-word arithmetic required for elliptic curve cryptology, includes the following. A memory 40, formed from two dual-port memories 41 and 42, temporarily stores n-word integers on which calculation is performed, and a calculation result. An arithmetic unit 20 executes two or more types of calculation, including addition and multiplication, on each word, and outputs a one-word result. A memory input/output unit 30 supplies a maximum of three pieces of one-word data from the memory 40 to the arithmetic unit 20, while simultaneously storing a one-word calculation result from the arithmetic unit 20 in the memory 40. A control unit 10 controls the arithmetic unit 20 and the memory input/output unit 30 so as to have the arithmetic unit execute one of modular addition and Montgomery reduction on n words.

5 Claims, 18 Drawing Sheets

FIG. 6A

| 41 |
|---|
| a0 |
| a1 |
| a2 |
| a3 |
| a4 |
| ⋮ |
| p0 |
| p1 |
| p2 |
| p3 |
| p4 |
| ⋮ |
| q0 |
| q1 |
| q2 |
| q3 |
| q4 |
| |

FIG. 6B

| 42 |
|---|
| b0 |
| b1 |
| b2 |
| b3 |
| b4 |
| ⋮ |
| c0 |
| c1 |
| c2 |
| c3 |
| c4 |
| ⋮ |
| w0 |
| w1 |
| w2 |
| w3 |
| w4 |
| |

CLOCK

FIG. 9A

| Reg←a0+b0+q0+carry | Reg←a1+b1+q1+carry | Reg←a2+b2+q2+carry | Reg←a3+b3+q3+carry |
|---|---|---|---|
| | w0←Reg | w1←Reg | w2←Reg |

FIG. 9B

| Reg←w0+p0+carry | Reg←w1+p1+carry | Reg←w2+p2+carry | Reg←w3+p3+carry |
|---|---|---|---|
| | c0←Reg | c1←Reg | c2←Reg |

FIG. 9C

| Reg←w0 | Reg←w1 | Reg←w2 | Reg←w3 |
|---|---|---|---|
| | c0←Reg | c1←Reg | c2←Reg |

FIG. 11A

| a0 |
|---|
| a1 |
| a2 |
| a3 |
| a4 |
| a5 |
| a6 |
| a7 |
| a8 |
| a9 |
| ⋮ |
| p0 |
| p1 |
| p2 |
| p3 |
| p4 |
| ⋮ |
| q0 |
| q1 |
| q2 |
| q3 |
| q4 |
| ⋮ |
| m0 |
| m1 |
| m2 |
| m3 |
| m4 |

| v0 |
|---|
| v1 |
| v2 |
| v3 |
| v4 |
| v5 |
| ⋮ |
| b0 |
| b1 |
| b2 |
| b3 |
| b4 |
| ⋮ |
| c0 |
| c1 |
| c2 |
| c3 |
| c4 |
| c5 |
| ⋮ |
| e0(0xffffffff) |
| ⋮ |
| m0 |
| m1 |
| m2 |
| m3 |
| m4 |

42

MULTI-WORD ARITHMETIC DEVICE FOR FASTER COMPUTATION OF CRYPTOSYSTEM CALCULATIONS

This application is based on an application No. 11-099657 filed in Japan, the content of which is hereby incorporated by reference.

BACKGROUND OF THE INVENTION

1. Field of the Invention

This invention relates to a device for executing modular arithmetic on multi-word (multiple-precision) integers and in particular to a device for executing two or more types of modular arithmetic.

2. Background Art

Many encryption systems use calculations performed on multi-word integers in a finite field. Here, a multi-word integer is an integer with a word-length exceeding that of the 32-bit word-length customarily used in a conventional CPU: for example 160 bits. If such a cryptosystem is to be implemented by a communication device or similar, an arithmetic unit capable of performing multi-word arithmetic at high-speed is required.

An arithmetic unit for performing encryption according to the RSA (Rivest, Shamir, Adleman) public-key cryptosystem is conventionally realized by manufacturing a specialized LSI formed from a multiplier and memory. Such an arithmetic unit is only capable of performing exponential modular arithmetic on multi-word integers. This computation is performed by repeatedly using a multiplier with a short bit-length. The arithmetic unit is used in combination with the CPU as a coprocessor.

One public key cryptosystem that has recently been gathering ground as an alternative to RSA encryption is elliptic curve cryptology (ECC). ECC is secure against attacks, such as index calculus, that are effective against RSA encryption, and uses key data with a much shorter word-length than that used in RSA encryption, while still preserving sufficiently high security. For example, the same level of security provided by a 1024-bit key in RSA encryption can be achieved in ECC with only a 160-bit key.

However, achieving such high security ECC requires a variety of other computations in addition to the exponential modular arithmetic necessary for RSA encryption. These include the four basic arithmetic operations, and computation performed using complex processing which is predetermined but includes conditional branches.

As a result, when ECC computation is performed using the above-mentioned specialized RSA encryption coprocessor, only a very limited number of calculations can be executed. In other words, most of the computation is performed by the CPU, so that overhead resulting from exchanges of control signals between the CPU and the coprocessor increases, thereby preventing high-speed processing from being realized.

On the other hand, if a software-based method in which the CPU executes all of the types of calculation necessary for ECC is used, the use of multi-word computation data requires the CPU to access the memory at an extremely high frequency. As a result, data cannot be supplied efficiently to the arithmetic unit in the CPU, preventing the realization of high-speed processing.

SUMMARY

One object of this invention is to provide a multi-word arithmetic device capable of high-speed execution of the various types of multi-word arithmetic required for elliptic curve cryptology and the like.

A further object is to provide a multi-word arithmetic device capable of executing, using a small-scale circuit, an operation selected from a plurality of types of multi-word arithmetic.

As is clear from the above explanation, the multi-word arithmetic device in the present invention executes modular arithmetic on multi-word integers, in accordance with instructions from an external device and includes the following: a memory, an arithmetic unit, a memory input/output circuit and a control circuit. The arithmetic unit executes, on word units, at least two types of calculation, including addition and multiplication, and outputs a one-word calculation result. The memory input/output circuit performs (1) a first data transfer for storing in the memory at least one integer received from an external device, (2) a second data transfer for inputting at least one integer stored in the memory into the arithmetic unit in word units, (3) a third data transfer for storing in the memory the calculation result output from the arithmetic unit, and (4) a fourth data transfer for outputting the calculation result from the memory to the external device. The control circuit, according to instructions received from the external device, (a) specifies, to the memory input/output unit, data to be transferred by the second and third data transfers, and (b) specifies, to the arithmetic unit, a type of calculation to be executed, thereby controlling (i) the arithmetic unit to selectively perform one of at least two types of modular arithmetic on the at least one integer stored in the memory; and (ii) the memory input/output circuit to store the calculation result of the modular arithmetic into the memory.

In this construction, a multi-word arithmetic device, having received instructions from an external device such as a CPU, acts independently of the external device to selectively execute one of two or more types of modular arithmetic required in elliptic curve cryptology. As a result the multi-word arithmetic device can be used as a coprocessor, thereby enabling high-speed multi-word arithmetic to be realized.

In addition, the multi-word arithmetic device performs multi-word arithmetic by repeatedly using an arithmetic unit operating in word units, in place of a long-word arithmetic unit. This means that the multi-word arithmetic device can be realized by a small-scale circuit.

Furthermore, the actual content of operations performed by the arithmetic unit and the memory input/output unit is not fixed, but is determined by a control circuit which receives instructions from the external device. As a result, controlling the number of times that the arithmetic unit is used and the like enables a flexible multi-word arithmetic unit capable of executing modular arithmetic at a variety of different security levels, i.e. on integers having a variety of word-lengths, to be realized without altering any hardware.

Here, at least two integers are stored in the memory, and the arithmetic unit includes an adder for adding at least two pieces of one-word data; and a multiplier for multiplying at least two pieces of one-word data. The memory input/output circuit simultaneously reads one word from each of the at least two integers stored in the memory, and outputs the read words to one of the adder and the multiplier.

This construction enables two pieces of data on which calculation is to be performed to be input simultaneously into the arithmetic unit, so that processing can be performed faster than would be the case if such data were input sequentially.

Here, the memory is divided into two dual-port memories, each allowing access to two storage areas designated by two addresses, and allowing (1) two read operations, or (2) one read operation and one write operation to be performed simultaneously on word units. The at least two integers are stored in each dual-port memory so that the memory input/output circuit can simultaneously (1) read a piece of one-word data simultaneously from each of the integers stored in the two dual-port memories, and have the read pieces of data input into one of the adder and the multiplier, and (2) write a piece of one-word data output from one of the adder and the multiplier into one of the two dual-port memories. This construction enables input of data from the memory to the arithmetic unit to be performed simultaneously with output of data from the arithmetic unit to the memory. As a result, overhead generated when data transfer is performed can be kept to a minimum. In other words, input and output to and from the memory is performed repeatedly in word units without any pauses, enabling high-speed processing to be performed.

The arithmetic unit, according to instructions from the control circuit, executes one of the following three calculations: (1) addition of at least two pieces of one-word data; (2) multiplication of two pieces of one-word data; and (3) multiplication of two pieces of one-word data and accumulation of multiplication results. The arithmetic unit includes a multiplier receiving an input of two pieces of one-word data and outputting a piece of two-word data, an adder receiving an input of at least two pieces of two-word data, including a piece of two-word data output from the multiplier, and outputting a piece of multi-word data, and a selecting circuit selecting, according to instructions from the control circuit (1) data to be input into one of the multiplier and the adder out of data transmitted from the memory input/output circuit; and (2) data to be output as the calculation result out of data output from one of the adder and the multiplier.

In this construction, the arithmetic unit performs one of three types of calculation according to a specification from the control circuit, despite being equipped with only one adder and one multiplier. This enables a multi-word arithmetic device capable of executing a wide variety of types of modular arithmetic to be realized with only a small-scale circuit.

Here, the at least two types of modular arithmetic include modular addition. On receiving, from the external device, an instruction to execute modular addition and an indication of a number of words n for each integer on which modular addition is to be performed, the control circuit controls the memory input/output circuit and the arithmetic unit to execute the following processing. (1) The memory input/output circuit obtains from the external device and stores in the memory two n-word integers A and B on which modular addition is to be executed and a n-word integer P showing a modulus. Then, (2) the memory input/output circuit (a) reads simultaneously, from the integers A, B and P stored in the memory, pieces of one-word data a, b and p, each with a same digit position, and has the read pieces of data input into the arithmetic unit, while (b) storing in the memory a piece of one-word data w output from the arithmetic unit, and repeats processes (a) and (b) sequentially from a lowest-order word in each integer until n words of data are obtained, enabling an n-word integer W to be stored in the memory. (3) The arithmetic unit repeats n times a process in which the pieces of data a, b and p received from the memory input/output circuit are computed as a +b−p, propagating a carry, and a result w is output. In this construction, the multi-word arithmetic unit speculatively executes a modular addition A+B−P so that when A and B are such that P≦A+B<2P, the modular addition of integer A and integer B can be completed by using only the processing in (1) to (3) above.

In addition, the control circuit determines whether a carry has been generated by the arithmetic unit immediately after completion of the processing (1) to (3) above, and if a carry has been generated, further controls the memory input/output circuit and the adder to execute the following processing. (4) The memory input/output circuit (a) reads simultaneously, from the integers W and P stored in the memory, pieces of one-word data w and p, each with a same digit position, and has the read pieces of data input into the arithmetic unit, while (b) storing in the memory a piece of one-word data c output from the arithmetic unit and repeats processes (a) and (b) sequentially from a lowest-order word in each integer until n words of data are obtained, enabling an n-word integer C to be stored in the memory. Then, (5) the arithmetic unit repeats n times a process in which the pieces of data w and p received from the memory input/output circuit are computed as w+p, propagating a carry, and a result c is output. This construction enables adjustment (recovery of mod P) to be performed when the result of A+B in the processing of (1) to (3) is negative.

Furthermore, the at least two types of modular arithmetic include Montgomery reduction calculating a residue for $A \cdot R^{\wedge}(-1)$ mod P, when each word has k bits, A is a 2n-word integer used for input data, R is an integer $2^{\wedge}(k \times n)$ and P is an n-word integer. Upon receiving, from the external device, an instruction to execute Montgomery reduction and an indication of a number of words 2n for an integer A on which Montgomery reduction is to be performed, the control circuit controls the memory input/output circuit and the arithmetic unit to execute Montgomery reduction. This construction realizes a multi-word arithmetic device executing Montgomery reduction, which is modular arithmetic based on a high-speed processing algorithm.

Furthermore, when receiving an instruction to execute Montgomery reduction from the external device, the control circuit controls the memory input/output circuit and the arithmetic unit so as to execute the following processing. (1) the memory input/output circuit acquires integers A, P and V from the external device and stores the obtained integers in the memory, the integer V being $-P^{\wedge}(-1)$ mod R. (2) The arithmetic unit computes partial products for words from each of (i) a lower n words of the integer A stored in the memory, and (ii) the integer V, and accumulates words in partial products having a same digit position, repeating the process sequentially from a lowest word in each integer until n words of accumulated results are obtained, and storing the accumulated results in the memory as a piece of n-word intermediate data B. (3) The arithmetic unit computes partial products for words from each of (a) the piece of intermediate data B and (b) the integer P stored in the memory, and accumulates words in the partial products having a same digit position so that, when a lowest word is a 0 th word, accumulated results for a 0 th to (n−3)th word are not obtained, but accumulated results for a (n−2)th word to a (2 n−1)th word are obtained and stored in the memory as the upper (n+1) words of a piece of intermediate data D. (4) The arithmetic unit (a) generates (i) a carry obtained from a one-word addition performed by adding a lowest word from each of the piece of intermediate data D and an integer AA, and (ii) a one-bit logical value, the integer AA being an upper (n+1) words of the integer A, and the one-bit logical value being 0 when a one-word addition result is 0, and 1 when the one-word addition result is not 0. The arithmetic unit then (b) adds an upper n words of the piece of intermediate data D, an upper n words of the integer AA, the carry and the one-bit logical value, by repeating addition of word units sequentially from a lowest word in each integer, while propagating a carry, until n words of data are obtained, and stores an addition result in the memory as a piece of n-word output data M. (5) When the output data M stored in the memory is at least as large as the integer P, the arithmetic unit subtracts the integer P from the output data M until the output data M is 0 or a positive integer smaller than the integer P, by repeating subtraction of word units sequentially from a lowest word in each integer, while propagating a carry, until n words of data are obtained, and stores the subtraction results in the memory as a new piece of n-word output data M.

The multiplication in processes (2) and (3) of this construction is performed by computing and accumulating only required partial products, rather than computing all possible partial product combinations. This enables multiplication processing to be shortened.

Furthermore, in processing (4), the arithmetic unit adds a piece of one-word data containing all ones to the piece of intermediate data D and the integer AA, and stores an upper n words of an obtained addition result in the memory as the output data M. The addition of the four pieces of data in processing (4) can be replaced in this construction with addition of three pieces of data, thereby allowing, for example, calculation that would have been performed on two separate occasions by the three-input adder to be performed on one occasion.

Furthermore, in processing (2) and (3), the arithmetic unit selects sets of word pairs, each set formed from all the pairs of words that generate a partial product with a same digit position, sets input values in the multiplier, and computes and accumulates the partial products for the selected pairs of words in sequence from the set with a lowest digit position. In this construction, the computation and accumulation of partial products is executed in an efficient order, so that pipeline irregularities are unlikely to be generated.

Furthermore, in processing (2) and (3), the arithmetic unit stores in the memory as part of a multiplication result a lower word from a two-word accumulated result obtained by accumulating partial products with the same digit position, and adds an upper word from the accumulated result to partial products that have a digit position one word higher and are thus the next to be calculated. The arithmetic unit also performs an operation for storing a lower word from the accumulated result in the memory, simultaneously with an operation for adding an upper word from the accumulated result to partial products that have a digit position one word higher and are thus the next to be calculated.

In this construction, accumulation of partial products is performed simultaneously with processing for propagating an upper word of the accumulation result to a partial product having a higher order digit (higher digit position). This means that accumulation for all of the partial products can be performed at high speed.

Furthermore, when computing and accumulating partial products in processing (2) and (3), the arithmetic unit updates accumulated values by (a) simultaneously (i) computing a partial product and (ii) reading a previously accumulated one-word value from the memory, (b) adding the accumulated one-word value to a corresponding word in the partial product, and (c) storing a result of the addition in a corresponding area of the memory.

This construction enables selection of the pairs of data to be multiplied to be performed with greater flexibility.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIGS. 6A and 6B show a memory map of a memory when modular addition is performed by the multi-word arithmetic device;

FIG. 9A is a timechart showing a pipeline operation for the arithmetic unit when the first processing from FIG. 7 is performed;

FIG. 9B is a timechart showing a pipeline operation for the arithmetic unit when the second processing from FIG. 7 is performed;

FIG. 9C is a timechart showing a pipeline operation for the arithmetic unit when the third processing from FIG. 7 is performed;

FIGS. 11A and 11B shows a memory map for the memory when Montgomery calculation is performed by the multi-word arithmetic device;

PREFERRED EMBODIMENT

The following is an explanation of an embodiment of the invention, with reference to the drawings.

Figure 1:
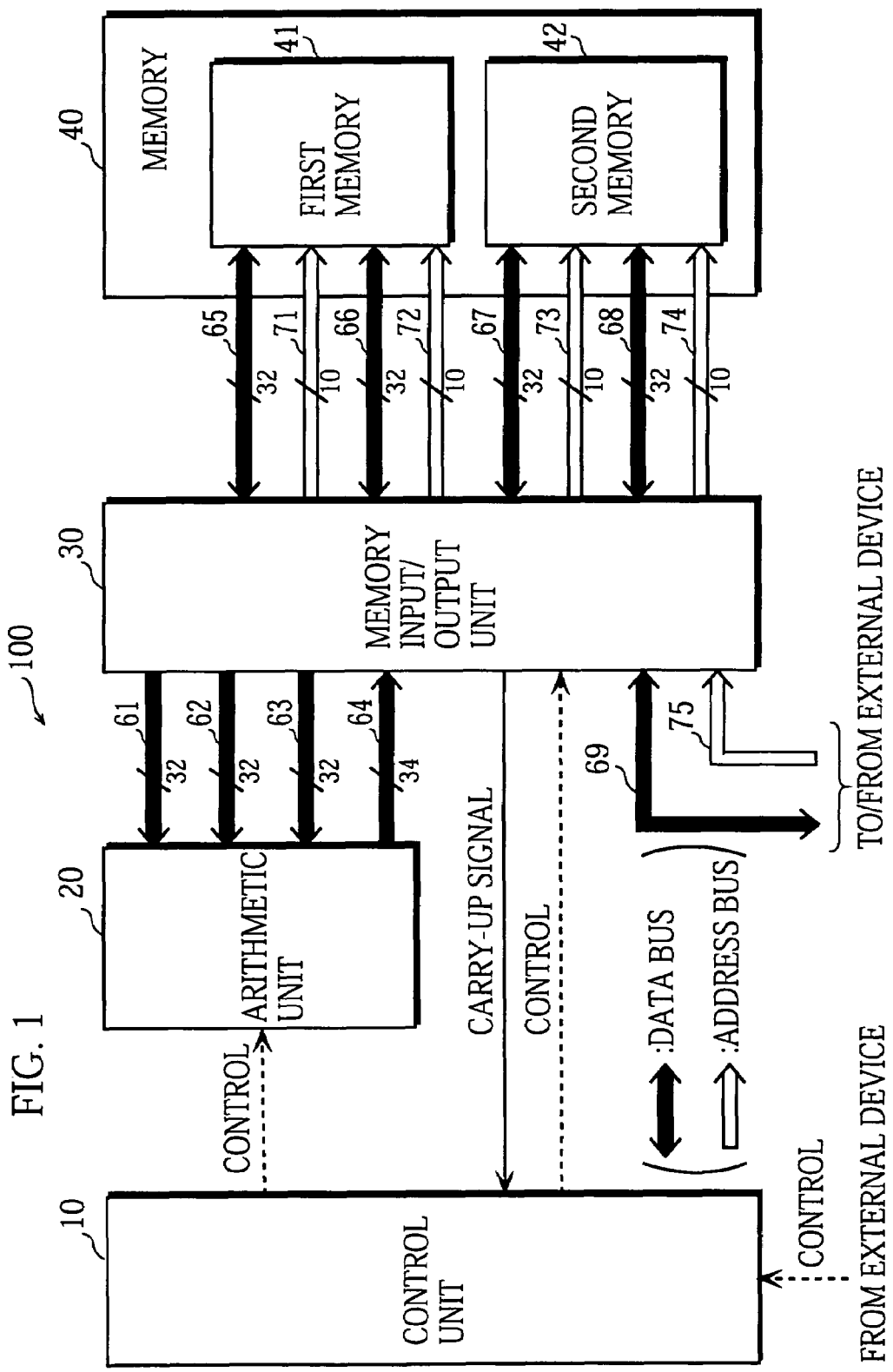
FIG. 1 is a block diagram showing a circuit construction for a multi-word arithmetic device in the invention.

FIG. 1 is a block diagram showing a circuit construction for a multi-word arithmetic device 100 in the invention. The multi-word arithmetic device 100 is a coprocessor (LSI) selectively executing two types of multi-word arithmetic based on instructions (indicating computation type, length of multi-word integers to be computed and the like) from an external device (not shown), the two types of multi-word arithmetic being modular addition of two five-word integers, and Montgomery reduction having an input of a ten-word integer. The multi-word arithmetic device 100 includes a control unit 10 whose operation is synchronized with a clock signal generated internally, an arithmetic unit 20, a memory input/output unit 30 and a memory 40.

Here, one word is equivalent to the length of data that can be computed during one clock cycle, in this case 32 bits. The external device is a CPU or similar, provided in a communication apparatus or the like that uses the multi-word arithmetic device 100.

Modular addition is addition modulo a constant P. Montgomery reduction is one algorithm used to perform high-speed modular arithmetic. Montgomery reduction includes a three-step calculation for finding M=A·R(−1)mod P for an input A approximate to P^2, when P and R are constants such that P<R=2^m. This calculation is hereafter referred to as Montgomery calculation. More details may be found by referring to Ango, Zero Chishikishoumei, Suron (Cryptography, Zero Knowledge Interactive Proof, Number Theory) by OKAMOTO Tatsuaki & OTA Kazuo, pub. Kyoritsu Shuppan 1995.

Input: A (a value of approximately 2 m bits)
Precomputation: V=−P^(−1) mod R
Output: M=A·R(−1) mod P
Processing:
Step 1: B=A×V mod R
Step 2: M=(B×P+A)/R
Step 3: output M mod P During one clock cycle, the arithmetic unit 20 either multiplies two pieces of one-word data or adds three pieces of one-word data, according to instructions from the control unit 10, and outputs 34-bit data including a piece of one-word data showing the result or part of the result of this calculation, and a 2-bit carry. The arithmetic unit 20 is connected to the memory input/output unit 30 by three data buses 61 to 63 for outputting and one data bus 64 for inputting.

The memory 40 temporarily stores integers on which multi-word arithmetic is performed by the multi-word arithmetic device 100, and intermediate data and calculation results generated by this calculation process. The memory 40 is formed from two separate dual-port memories, a first memory 41 and a second memory 42, each of which can be accessed in word units, and is connected to the memory input/output unit 30 via four data buses 65 to 68 and four address buses 71 to 74.

Each of the first and second memories 41 and 42 has a storage capacity of 256 words, and is capable of reading a piece of one-word data (partial integer) simultaneously from a maximum of two different storage areas via two input/output ports during one clock cycle.

The memory input/output unit 30 is an interface circuit performing data transfer between the arithmetic unit 20 and the memory 40, and between an external device and the memory 40, according to instructions from the control unit 10.

The control unit 10 includes ROM for storing a control program, a logic circuit for outputting control signals according to this program, and RAM. The control unit 10 performs, for example, one of modular addition of two five-word integers stored in the memory 40 and Montgomery calculation on a ten-word integer, by controlling the arithmetic unit 20 and the memory input/output unit 30, based on instructions (indicating computation type, length of multi-word integers which are to be computed and the like) from an external device.

Figure 2:
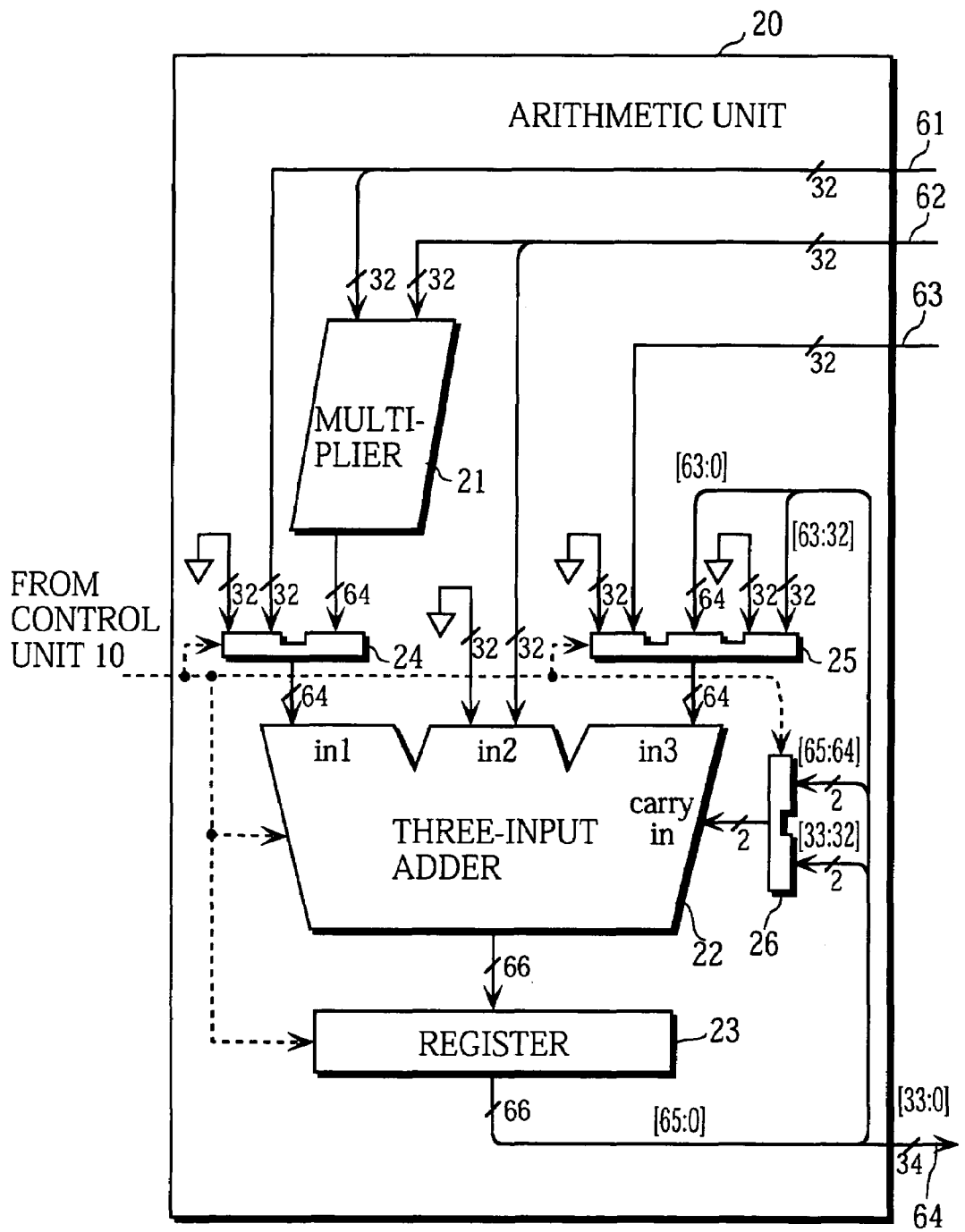
FIG. 2 is a circuit diagram showing a detailed construction of an arithmetic unit in the multi-word arithmetic device.

FIG. 2 is a circuit drawing showing a detailed construction of the arithmetic unit 20 in FIG. 1. The arithmetic unit 20 includes a multiplier 21, a three-input adder 22, a register 23 and three selectors 24 to 26. The notation [n:m] in the drawing indicates the nth to mth bits of a specified bit sequence, when the least significant bit is the 0 th bit.

The multiplier 21 multiplies two pieces of one-word data transmitted from the memory input/output unit 30 via two data buses 61 and 62, and outputs the result of this multiplication as a piece of two-word data.

The three-input adder 22 adds (a) a piece of two-word data input into a first input port $in_1$ from the selector 24, (b) a piece of two-word data input into a second input port $in_2$, the lower word being a piece of one-word data transmitted from the memory input/output unit 30 via the data bus 62, and the upper word being '0', (c) a piece of two-word data input into a third input port $in_3$ from the selector 25, and (d) a 2-bit carry input into a carry input terminal (marked 'carry in' in the drawing) from the selector 26. The obtained 66-bit data (the upper 2 bits being a carry and the following bits a piece of two-word data) is output to the register 23.

The three-input adder 22 can add negative numbers (numbers represented by a two's complement), so that a carry can be output when there is an underflow (borrow), and not just when there is an overflow.

The register 23 stores the 66-bit data output from the three-input adder 22 for only one clock cycle. In the next clock cycle, the 66-bit data held in the register 23 is output as follows. An upper 2-bit carry [65:64] and a middle 2-bit carry [33:32] are transferred to the selector 26, and the lower two words of data are transferred to the selector 25, with the lower 34 bits being output to the memory input/output unit 30 via the data bus 64.

The selector 24 selects, according to an instruction from the control unit 20, one of (i) a piece of two-word data produced by zero-extending the one-word data transmitted from the memory input/output unit 30 via the data bus 61, and (ii) a piece of two-word data output from the multiplier 21, and outputs the selected data to the first input port $in_1$ of the three-input adder 22.

The selector 25 selects, according to an instruction from the control unit 10, one of (i) a piece of two-word data produced by zero-extending a piece of one-word data transmitted from the memory input/output unit 30, (ii) a piece of two-word data output from the register 23, and (iii) two-word data produced by zero-extending the upper word of the piece of two-word data output from the register 23, and outputs the selected data to the third input port $in_3$ of the three-input adder 22.

The selector 26 is a circuit for propagating a carry generated by the addition performed in a certain clock cycle by the three-input adder 22 to the addition occurring in a next clock cycle. The selector 26 selects, according to instructions from the control unit 10, one of the 2-bit carries (i) [65:64] and (ii) [33:34] transmitted from the register 23, and transmits the selected carry to the carry input terminal of the three-input adder 22.

Figure 3:
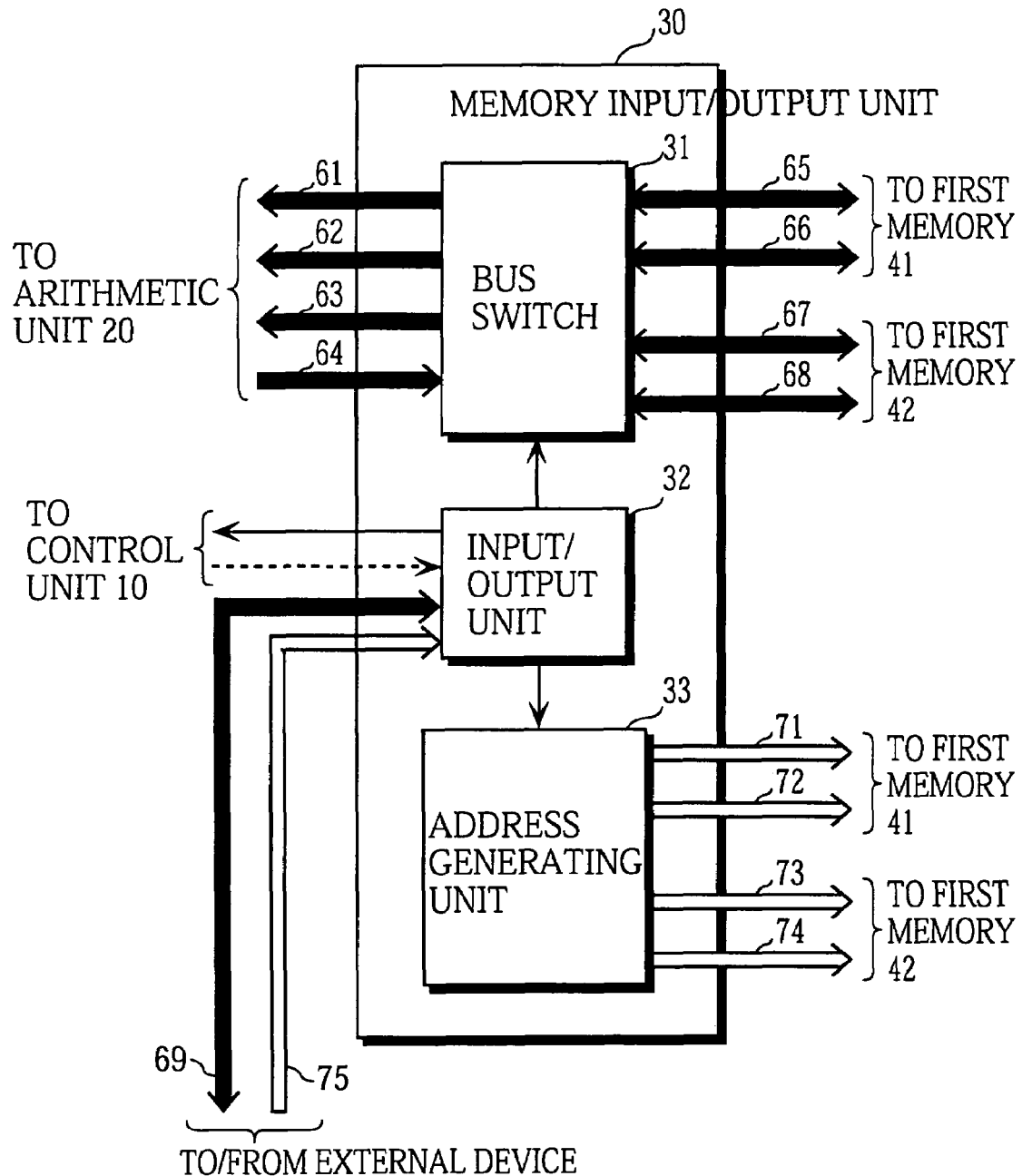
FIG. 3 is a circuit diagram showing a detailed construction of a memory input/output unit in the multi-word arithmetic device.

FIG. 3 is a circuit drawing showing a detailed construction of the memory input/output unit 30 of FIG. 1. The memory input/output unit 30 has a bus switch 31, an input/output control unit 32 and an address generating unit 33.

The bus switch 31 combines a plurality of selector circuits, and connects each of the four data buses 61 to 64 connected to the arithmetic unit 20 to one of the four data buses 65 to 68 connected to the memory 40, according to instructions from the input/output unit 30.

The address generating unit 33 includes four separate address registers and an incrementer, and generates four sets of access control signals (each containing an address signal, a read/write signal and the like) and outputs the four sets of signals to four address buses 71 to 74, according to instructions from the input/output control unit 32.

The input/output control unit 32 controls the bus switch 31 and the address generating unit 33 based on instructions from the control unit 10 to perform the following operations. The arithmetic unit 20 performs a maximum of four separate accesses of the memory 40 simultaneously. It also performs data transmission between a connected external device and the memory 40 via the data bus 69 and an address bus 75, and transfers to the control unit 10, as a carry signal, information relating to a carry transmitted from the arithmetic unit 20.

The following is an explanation of the operation of the multi-word arithmetic device 100.

Figure 4:
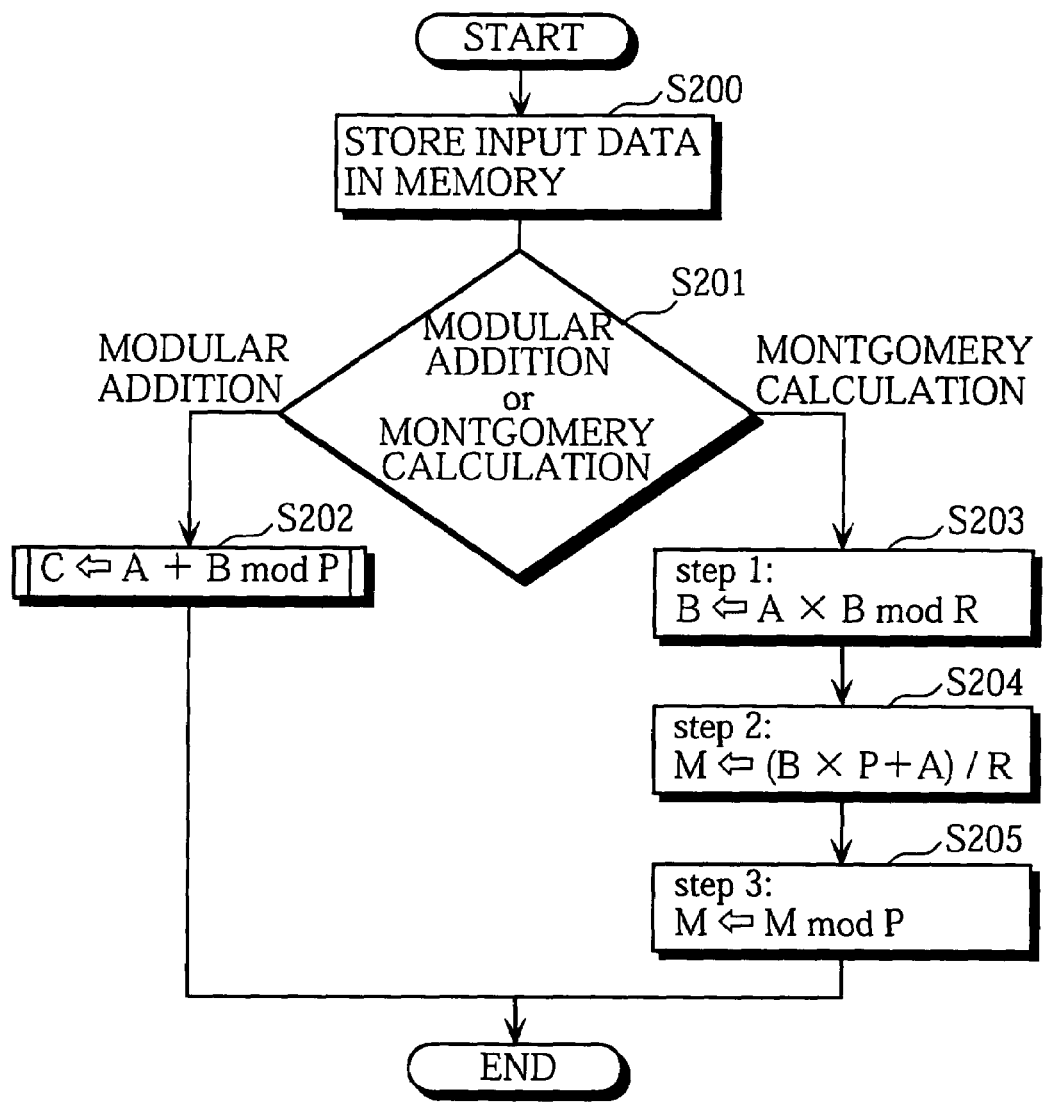
FIG. 4 is a flowchart showing an overall operating procedure for the multi-word arithmetic device.

FIG. 4 is a flowchart showing the general operating procedure for the multi-word arithmetic device 100.

First, the memory input/output unit 30 receives input data from the external device via the data bus 69 or the address bus 75, the input data being integers which are to be computed, integers resulting from precomputation and the like. Received integers are stored in a designated area in the memory 40 (step S200).

Next, the control unit 10 receives an instruction from the external device indicating which of modular addition and Montgomery calculation should be performed (step S201).

Upon receiving an instruction indicating that modular addition should be performed, the control unit 10 transmits preprogrammed control signals to the arithmetic unit 20 and the memory input/output unit 30, thereby having the arithmetic unit 20 execute modular addition on two five-word integers A and B stored in the memory 40, and having the result of this calculation C stored in the memory 40 (step S202).

Upon receiving an instruction indicating that Montgomery calculation should be performed, the control unit transmits preprogrammed control signals to the arithmetic unit 20 and the memory input/output unit 30, thereby having the arithmetic unit 20 execute steps 1 to 3 of the above-described Montgomery calculation in sequence, using an integer A stored in the memory 40, or similar, and having a final result M stored in the memory 40 (step S203 to 205).

Note that the modular addition result C and Montgomery calculation result M are read by the external device via the memory input/output unit 30.

The following is an explanation of an actual example of computation performed by the multi-word arithmetic device 100.

First, modular addition (C=A+B mod P) performed by the multi-word arithmetic device 100 is explained with reference 10) to FIGS. 5 to 9.

Figure 5:
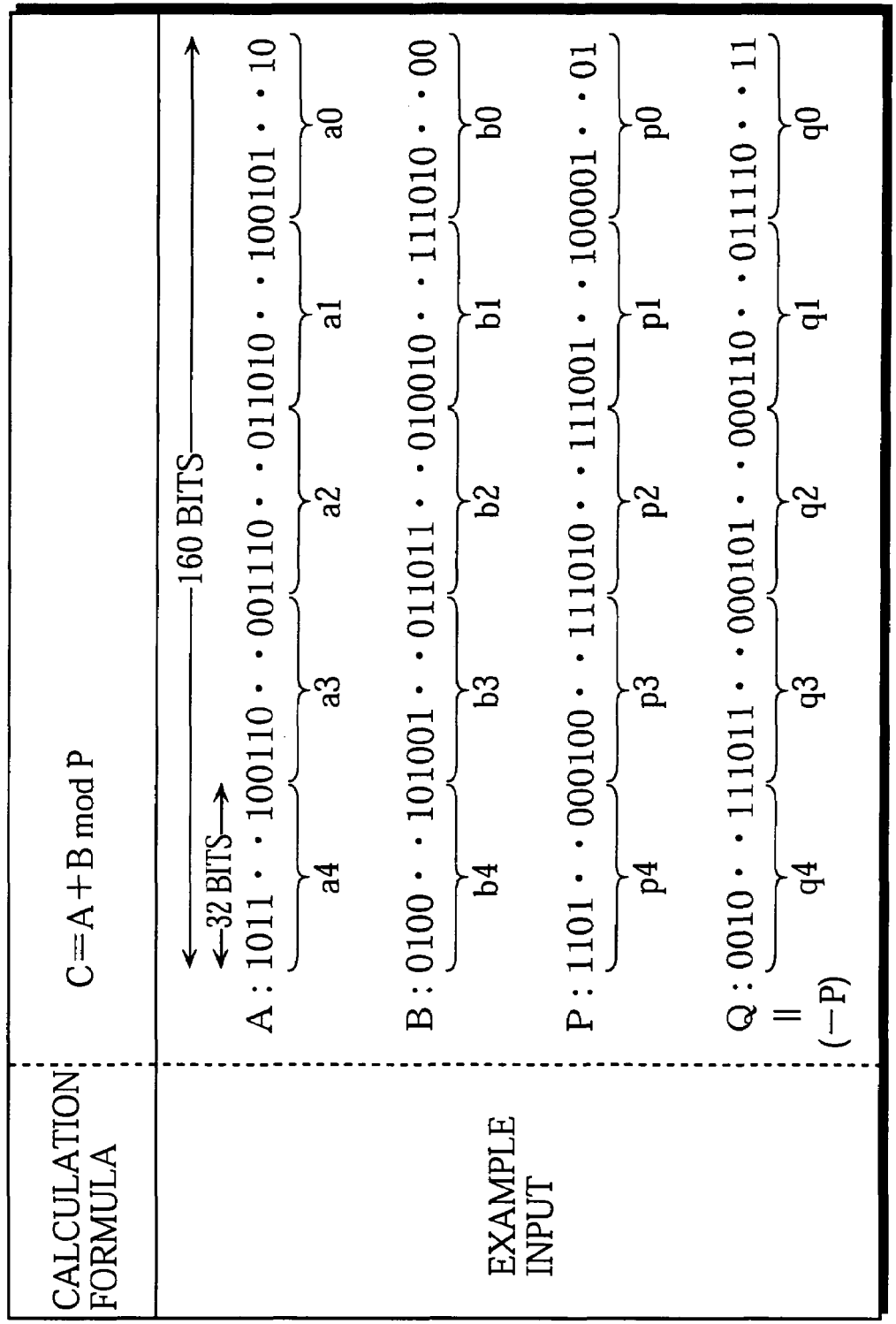
FIG. 5 shows a calculation formula for modular addition performed by the multi-word arithmetic device and examples of input data obtained by the multi-word arithmetic device from an external device.

FIG. 5 shows a calculation formula for modular addition and examples of input data transferred to the multi-word arithmetic device 100 from the external device when modular addition is performed, in this case examples of input data A, B, P and Q stored in the memory 40 via the memory input/output unit 30.

Integer A is one calculation object for modular addition, and is a five-word integer in which five words $a_4$, $a_3$, $a_2$, $a_1$ and $a_0$ are arranged in sequence starting with the most significant digit (this kind of multi-word integer is hereafter written as $[a_4, a_3, a_2, a_1, a_0]$ or similar). Integer B is another calculation object for modular addition, and is a five-word integer $[b_4, b_3, b_2, b_1, b_0]$. Integer P is a modulus used for modular addition, and is a five-word integer $[p_4, p_3, p_2, p_1, p_0]$. Integer Q is a five-word integer $[q_4, q_3, q_2, q_1, q_0]$ equal to a value −P produced by inverting the sign for integer P.

FIG. 6 shows a memory map of the memory 40 when modular addition is performed by the multi-word arithmetic device 100. Here, the above four pieces of input data A, B, P and Q are shown along with an five-word integer C $[c_4, c_3, c_2, c_1, c_0]$ for storing the calculation result and intermediate data W $[w_4, w_3, w_2, w_1, w_0]$ generated by the modular addition.

The first memory 41 stores integers A, P and Q, and the second memory 42 stores integers B and C and intermediate data W. A memory map like the one in the drawing enables the arithmetic unit to simultaneously transfer two words selected from the integers A, P and Q, and two words selected from the integers B, C and W, during one clock cycle.

Figure 7:
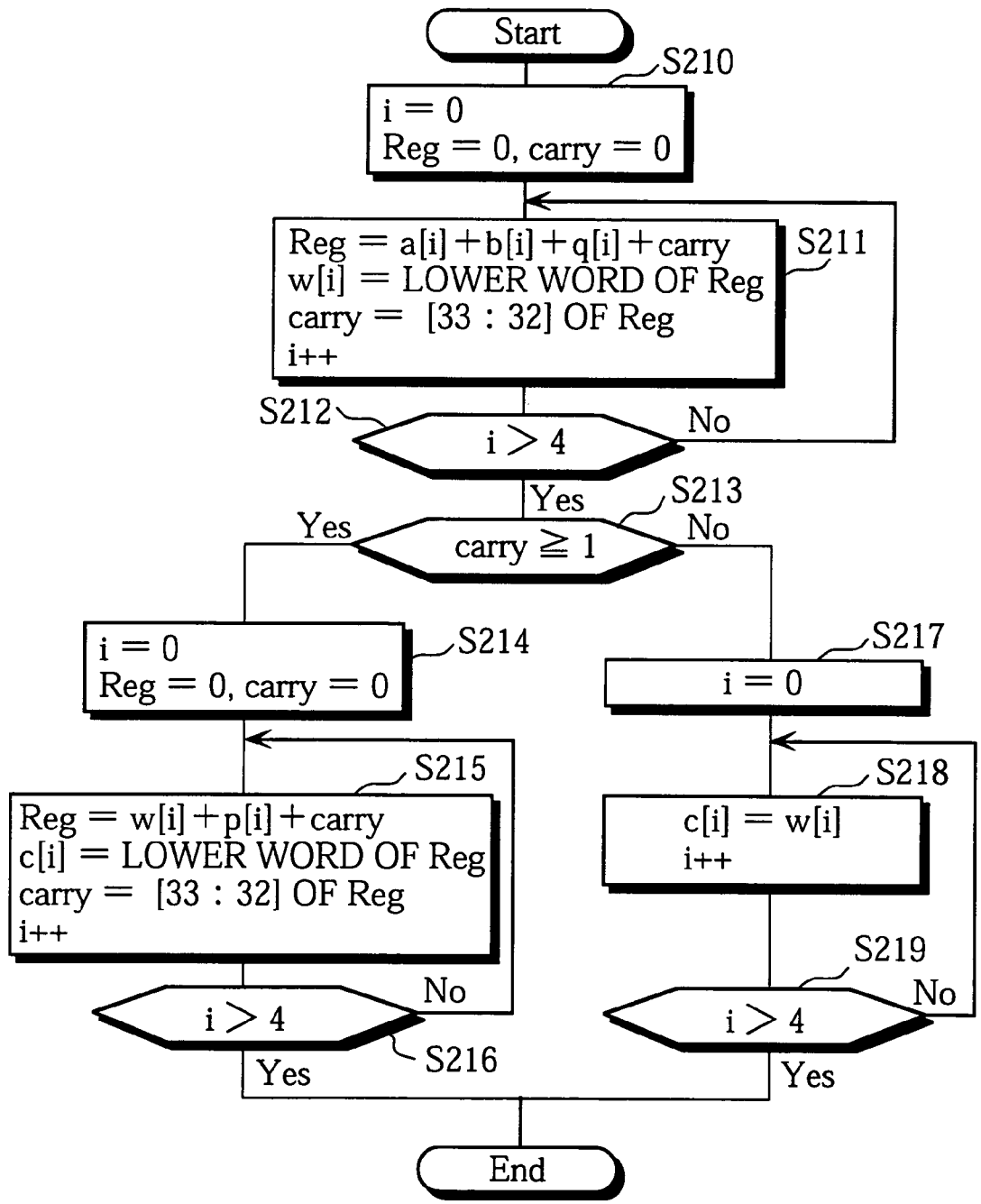
FIG. 7 is a flowchart showing an operating procedure when modular addition is performed by the multi-word arithmetic device.

FIG. 7 is a flowchart showing the operating procedure by which the multi-word arithmetic device 100 executes modular addition, in other words the detailed procedure for step S202 in FIG. 4.

The modular addition performed by the multi-word arithmetic device 100 can be broadly divided into three processes. In a first process, modular addition of an individual word is repeated five times (steps S210 to S212). In a second process, modular addition for an individual word is repeated five times (a recovery operation) when a carry has been generated by the first process. (steps S214 to S216). In a third process, data transmission for substituting the intermediate data W into the calculation result C is repeated five times, when a carry has not been generated by the first process (steps S217 to S219).

Figure 8A:
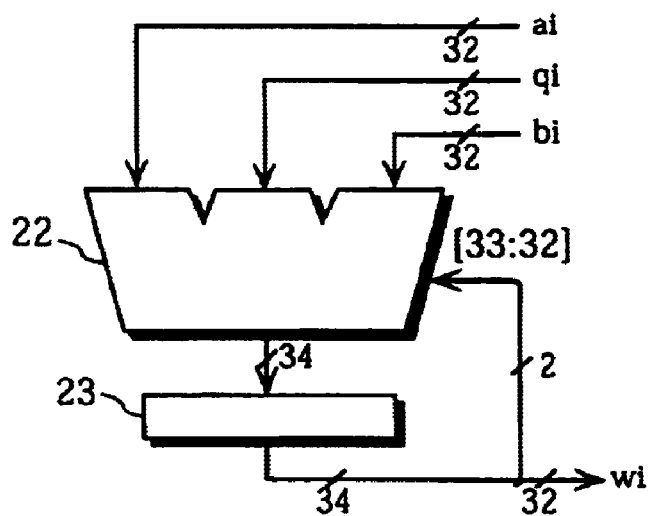
FIG. 8A shows the operational state (calculation function) and input data for the arithmetic unit when the first processing from FIG. 7 (Steps S210 to S212) is performed.
Figure 8B:
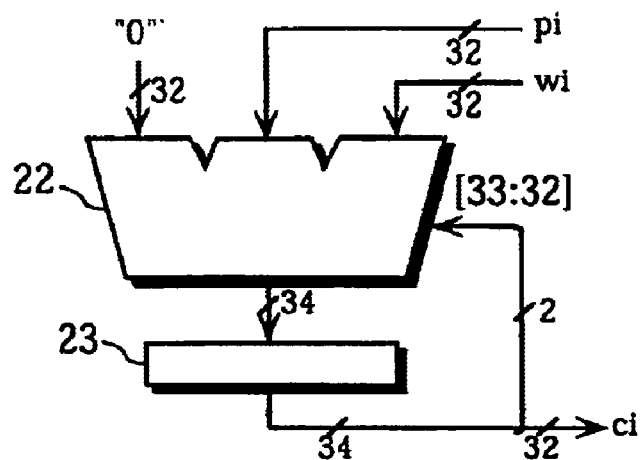
FIG. 8B shows the operational state (calculation function) and input data for the arithmetic unit when the second processing from FIG. 7 (Steps S214 to S216) is performed.
Figure 8C:
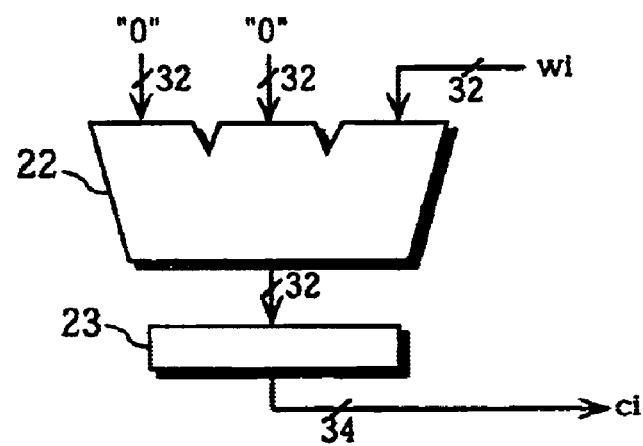
FIG. 8C shows the operational state (calculation function) and input data for the arithmetic unit when the third processing from FIG. 7 (Steps S217 to S219) is performed.

FIGS. 8A to 8C show the operating state (calculation function) and input data for the arithmetic unit 20 for the first process (step S210 to S216), second process (step S217 to S219) and third process (step S217 to S219) of FIG. 7 respectively.

In the first process, the arithmetic unit 20 operates as a one-word three-input adder, adding three pieces of data $a_i$, $b_i$ and $q_i$, and substituting the result of the addition into a piece of data $w_i$. In the second process, the arithmetic unit 20 operates as a one-word two-input adder, adding two pieces of data $p_i$ and $w_i$ and substituting the result of the addition into a piece of data $c_i$. In the third process, the arithmetic unit operates as a one-word data transfer unit, substituting the piece of data $w_i$ into the piece of data $c_i$.

The operating state of the arithmetic unit 20 is determined by control signals output to the arithmetic unit 20 from the control unit 10. The input data for the arithmetic unit 20 is determined by control signals output to the memory input/output unit 30 from the control unit 10. Moreover, the output of a fixed value '0' to one of the input ports of the three-input adder 22 is realized by controlling the selectors 24 and 25 or the memory input/output unit 30 to output a piece of data that contains '0' in all its bit positions.

FIGS. 9A to 9C are timecharts showing pipeline processing performed by the arithmetic unit 20 for the first process (steps S210 to S212), the second process (steps S214 to 216) and the third process (steps S217 to S219) respectively. The register 23 in the arithmetic unit 20 holds the output from the three-input adder 22, so that two stages of the pipeline, calculation performed by the three-input adder 22 and storage in the memory 40 of the previous calculation result obtained by the three-input adder 22, can be executed in parallel during one clock cycle.

In the first process, as is shown in FIG. 7, the control unit 10 first transmits control signals to the arithmetic unit 20 and the memory input/output unit 30, thereby putting the arithmetic unit 20 in the operating state shown in FIG. 8A. Next, the control unit 10 outputs an initializing control signal to the arithmetic unit 20, thereby setting both a value Reg held in the register 23 and a carry Car (Reg [33:32]) at an initial value of '0' (step S210).

Then, the arithmetic unit 20, during each clock cycle, repeats in parallel (i) the operation for adding two pieces of data $a_i$ and $q_i$ transmitted from the first memory 41 via the memory input/output unit 30, the piece of data $b_i$ transmitted from the second memory 42 and the carry Car generated during the previous calculation, and storing the result of the addition in the register 23, and (ii) the operation for writing a lower word from the held value Reg in the register 23 into a storage area $w_i$ in the second memory 42 (step S211).

This means that the arithmetic unit 20 repeats the pipeline processing as shown in FIG. 9A in the following way. During a first clock cycle, the arithmetic unit 20 adds three pieces of data $a_0$, $b_0$ and $q_0$, and stores the result of this addition as the value Reg in the register 23. Then in a subsequent second clock cycle, the arithmetic unit 20 adds three pieces of data $a_1$, $b_1$ and $q_1$ and a carry Car generated by the calculation in the first clock cycle, and stores the result as the value Reg in the register 23, while simultaneously writing the value Reg held in the register 23 as a result of the previous calculation in a storage area $w_0$ in the second memory 42.

The arithmetic unit 20 repeats calculation and storage of a calculation result in the second memory 42 five times in total, i.e for five words, under the control of the control unit 10 (steps S211 and S212). As a result, the computation for W=A+B+Q, in other words W=A+B−P, is completed.

Next, the control unit 10 determines whether a carry Car (here a borrow) has been generated by the addition in a fifth clock cycle (step S213). If a carry Car has been generated, the control unit 10 has the arithmetic unit 20 execute the second process (steps S214 to S216), but if not, it has the arithmetic unit 20 execute the third process (steps S217 to S219).

The reason for this is that, if the intermediate data W obtained in the first process is a negative value, the final result C (A+B mod P) is obtained by adding the modulus P to the intermediate data W (value for performing recovery operation). If, however, the intermediate data W is a positive value, this piece of data is used directly as the final result C.

In the second process, the control unit 10 first transmits control signals to the arithmetic unit 20 and the memory input/output unit 30, thereby putting the arithmetic unit 20 in the operating state shown in FIG. 8B. Next, the control unit 10 outputs an initializing control signal to the arithmetic unit 20, thereby setting both a value Reg held in the register 23 and a carry Car (Reg [33:32]) at an initial value of '0' (step S214).

Then, the arithmetic unit 20, during each clock cycle, repeats in parallel (i) the operation for adding a piece of data $p_i$ and a piece of data $w_i$, transmitted via the memory input/output unit 30 from the first memory 41 and the second memory 42 respectively, to the carry Car generated during the previous calculation, and storing the result of the addition as the value Reg in the register 23, and (ii) the operation for writing a lower word from the value Reg held in the register 23 into a storage area $c_i$ in the second memory 42 (step S215).

This means that the arithmetic unit 20 repeats the pipeline processing as shown in FIG. 9B in the following way. During a first clock cycle, the arithmetic unit 20 adds two pieces of data $p_0$ and $w_0$, and stores the result of this addition as the value Reg in the register 23. Then in a subsequent second clock cycle, the arithmetic unit 20 adds the two pieces of data $P_1$ and $w_1$ and a carry Car generated by the computation in the first clock cycle, and stores the result as the value Reg in the register 23, while simultaneously writing the value Reg held in the register 23 as a result of the previous calculation in a storage area $c_0$ in the second memory 42.

The arithmetic unit 20 repeats calculation and storage of a calculation result in the second memory 42 five times in total, i.e for five words, under the control of the control unit 10 (steps S215 to S216). As a result, the computation for C=W+P, in other words C=A+B mod P, is completed.

In the third process, the control unit 10 transmits control signals to the arithmetic unit 20 and the memory input/output unit 30, thereby initializing the arithmetic unit 20 so that it is in the operating state shown in FIG. 8C (step S217).

Then, the arithmetic unit 20, during each clock cycle, repeats in parallel (i) the operation for storing the piece of data $w_i$ transmitted from the first memory 42 directly in the register 23, and (ii) the operation for writing a lower word from the value Reg held in the register 23 into the storage area $c_i$ in the second memory 42 (step S218).

This means that the arithmetic unit 20 repeats the pipeline processing as shown in FIG. 9C in the following way. During a first clock cycle, the arithmetic unit 20 stores the piece of data $w_0$ in the register 23 as it is. Then in a subsequent second clock cycle, the arithmetic unit 20 stores the piece of data $w_1$ as the value Reg in the register 23, while simultaneously writing the value Reg held in the register 23 from the previous cycle into the storage area $c_0$ in the second memory 42.

The arithmetic unit 20 repeats data transfer five times in total, i.e for five words, under the control of the control unit 10 (steps S218 and S219). As a result, the computation for C=W, in other words C=A+B mod P, is completed.

Using the above processing method, the multi-word arithmetic device 100 can complete modular addition of five words during just ten clock cycles, despite being equipped with a small arithmetic unit 20 which is only capable of performing calculation on one word during each clock cycle. Moreover, if no carry has been generated upon completion of the first process, a result W for the modular addition of five words can be obtained after only five clock cycles.

The following is an explanation of the operating procedure used when Montgomery calculation (M=A·R^(-1) mod P) is executed by the multi-word arithmetic device 100, with reference to FIGS. 10 to 16.

Figure 10:
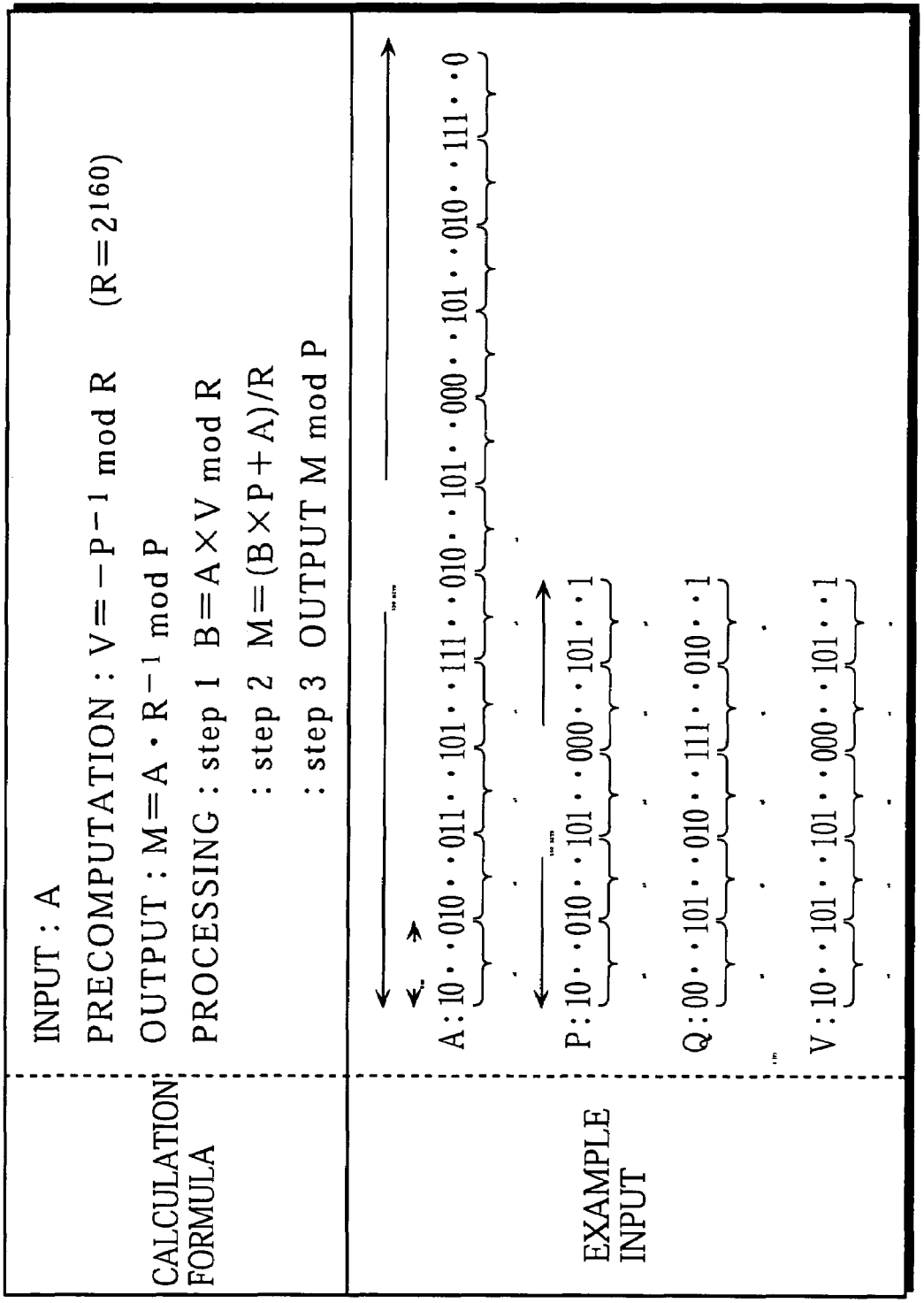
FIG. 10 shows a calculation formula for Montgomery calculation used by the multi-word arithmetic device and examples of input data obtained by the multi-word arithmetic device from an external device.

FIG. 10 shows a Montgomery calculation algorithm and examples of input data transmitted to the multi-word arithmetic device 100 from the external device when Montgomery calculation is performed, in other words input data A, P and V stored in the memory 40 via the memory input/output unit 30.

The integer A is data on which Montgomery calculation is performed, and consists of a ten-word integer [$a_9, a_8 \ldots a_1, a_0$]. The integer P is a modulus used in modular arithmetic and is a five-word integer [$p_4, p_3, p_2, p_1, p_0$]. The integer Q is a five-word integer [$q_4, q_3, q_2, q_1, q_0$] produced by inverting the sign of the integer P (-P). The integer V is a five-word integer [$v_4, v_3, v_2, v_1, v_0$] forming a calculation result for the above-mentioned precomputation performed by the external device.

FIG. 11 shows a memory map for the memory 40 when Montgomery calculation is performed by the multi-word arithmetic device 100. Here, five-word intermediate data B [$b_4, b_3, b_2, b_1, b_0$] generated by calculation processing, six-word intermediate data C [$c_5, c_4, c_3, c_2, c_1, c_0$], a one-word fixed value E [$e_0$] required for the calculation processing (0xffffffff; a word containing all ones) and five-word integers M [$m_4, m_3, m_2, m_1, m_0$] and N [$n_4, n_3, n_2, n_1, n_0$] for storing the final result of the Montgomery calculation are shown in addition to the four pieces of input data A, P, Q and V.

Integers A, P, Q and M are stored in the first memory 41, and integer V, intermediate data B and C, fixed value E and integer N in the second memory 42. Using this kind of memory map, the arithmetic unit 20 can simultaneously transfer two words selected from the four pieces of data A, P, Q and M and two words selected from two of the three pieces of data V, B, C and E, during one clock cycle.

Step 1

Figure 12A:
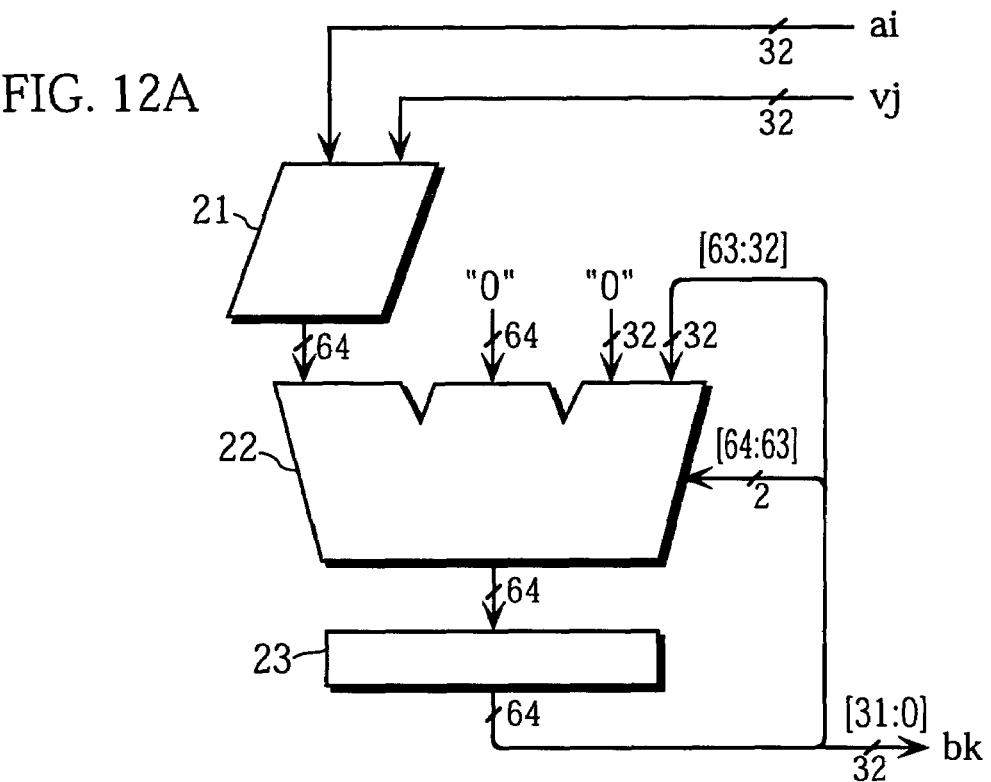
FIG. 12A shows the operating state and input data for the arithmetic unit when partial products with a same digit position are computed and accumulated for a first time in the Montgomery calculation of step 1.
Figure 12B:
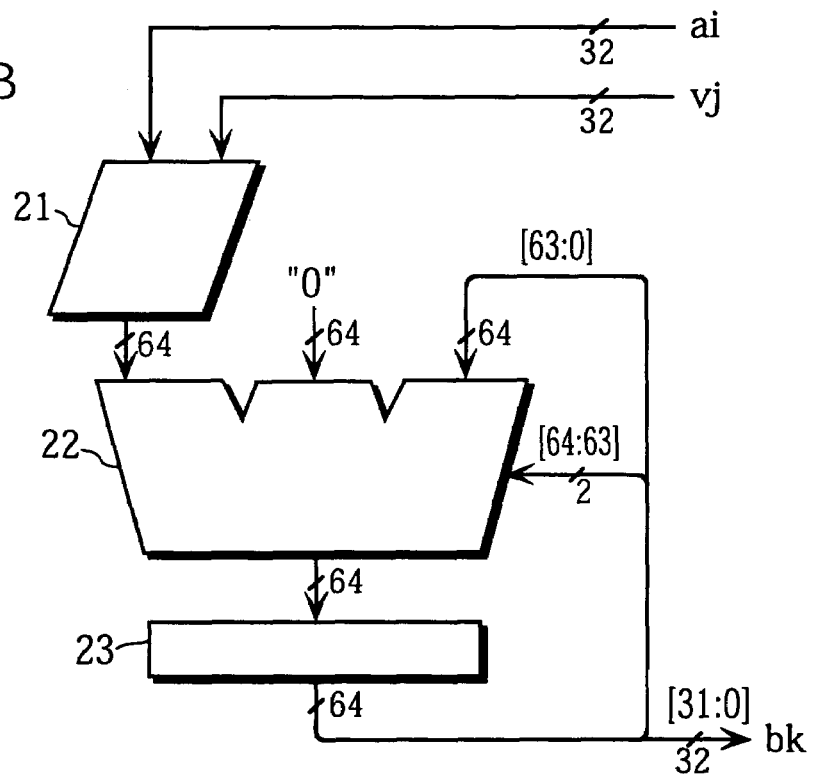
FIG. 12B shows the operating state and input data for the arithmetic unit when partial products with a same digit position are computed and accumulated for a second time onwards in the Montgomery calculation of step 1.
Figure 13:
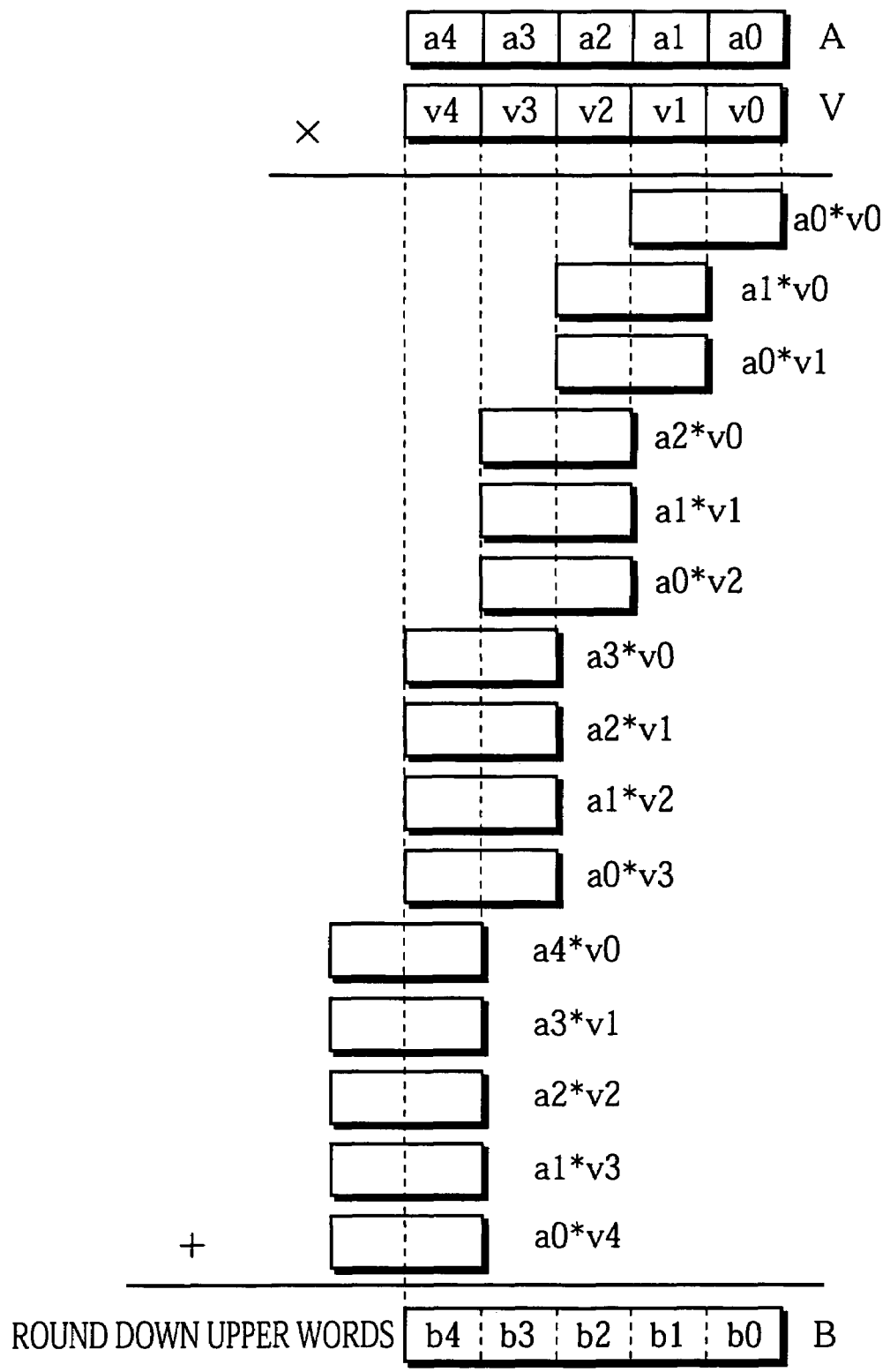
FIG. 13 shows calculating procedure when the arithmetic unit executes the Montgomery calculation in step 1.

The following is a detailed explanation of operations executed in step 1 of the Montgomery calculation performed by the multi-word arithmetic device 100, in other words step S203 in FIG. 4, with reference to FIGS. 12A, 12B and 13.

FIGS. 12A and 12B show the operating state and input data for the arithmetic unit 20 when step 1 of the Montgomery calculation is executed. The arithmetic unit 20 multiplies each word $a_i$ forming the integer A with each word $v_j$ forming the integer V, obtaining partial products with a same digit position (in this case, one digit is equivalent to one word) which it then accumulates (totals), and substitutes the cumulative result into the integer B.

FIG. 12A shows the operating state of the arithmetic unit 20 when a first addition is performed for accumulating partial products with a same digit position. Here, the selector 25 in the arithmetic unit 20 selects a piece of two-word data, by zero-extending the upper word of a piece of two-word data output from the register 23. This operation is performed to add the upper word of a two-word cumulative value, obtained by accumulating partial products with a same digit position, to a sum of its upper partial products, in other words to a sum of the partial products that are positioned shifted one word to the left of the originally accumulated partial products.

FIG. 12B shows the operating state of the arithmetic unit 20 when addition of cumulative values for partial products with the same digit position is performed for the second time onwards. Here, the selector 25 in the arithmetic unit 20 selects a piece of two-word data output from the register 23.

FIG. 13 shows the calculating procedure when step 1 of the Montgomery calculation is executed by the arithmetic unit 20. The upper part of the drawing shows the integers A [$a_4, a_3, a_2, a_1, a_0$] and V [$v_4, v_3, v_2, v_1, v_0$] on which multiplication is performed, the central part shows partial products arranged in order of calculation and the lower part is a representation of a process in which a sum of partial products having a same digit position is substituted into a word in the integer B [$b_4, b_3, b_2, b_1, b_0$].

The reason for multiplying only the lower five words of the ten-word integer A is that, as shown in FIG. 10, step 1 of the Montgomery calculation only needs to compute a residue for the integer R (mod R).

The actual operation performed in step 1 by the arithmetic unit 20 is as follows.

First, the control unit 10 initializes the arithmetic unit 20 by transmitting control signals to the arithmetic unit 20 and the memory input/output unit 30.

In a first clock cycle, after a control signal from the control unit 10 puts the arithmetic unit 20 in the operating state shown in FIG. 12A, the arithmetic unit 20 uses the multiplier 21 to multiply a piece of data $a_0$ and a piece of data $v_0$ transmitted via the memory input/output unit 30 from the first memory 41 and the second memory 42 respectively, and stores the result of the multiplication in the register 23.

In a second clock cycle, the arithmetic unit 20 uses the multiplier 21 to multiply a piece of data $a_1$ and a piece of data $v_0$, transmitted from the first memory 41 and the second memory 42 respectively, adds the result of this multiplication to a value obtained by downshifting the multiplication result obtained in the first clock cycle by one word, and stores the result of the addition in the register 23. Simultaneously, the arithmetic unit 20 writes the lower word of the multiplication result from the first clock cycle held in the register 23 into a storage area $b_0$ in the second memory 42.

In a third clock cycle, after being put in the operating state shown in FIG. 12B by a control signal transmitted from the control unit 10, the arithmetic unit 20 uses the multiplier 21 to multiply the piece of data $a_0$ and a piece of data $v_1$ transmitted from the first memory 41 and the second memory 42 respectively, adds the result of this multiplication to the two-word cumulative value stored in the register 23 and stores the result of the addition in the register 23.

In a fourth clock cycle, after being put in the operating state shown in FIG. 12A by a control signal transmitted from the control unit 10, the arithmetic unit 20 uses the multiplier 21 to multiply a piece of data $a_2$ and the piece of data $v_0$ transmitted from the first memory 41 and the second memory 42 respectively, adds the result of this multiplication to a value obtained by downshifting the multiplication result from the third clock cycle by one word, and stores the result of the addition in the register 23. Simultaneously, the arithmetic unit 20 writes a lower word from the multiplication result of the third clock cycle held in the register 23 into a storage area $b_1$ in the second memory 42.

Subsequently, the arithmetic unit 20 repeats calculation of and accumulation of partial products with the same digit position, for all combinations of data $a_i$ and $v_j$ where the sum of $i$ and $j$ is no greater than 4, and stores the results of these calculations in the storage areas $b_0$, $b_1$, $b_2$ and $b_4$.

This completes the processing for step 1. The upper five words remaining in the register 23 after the multiplication and accumulation in the fifteenth clock cycle have been completed are rounded down.

Step 2

The following is a detailed explanation of step 2 of the Montgomery calculation performed by the multi-word arithmetic device 100, in other words step S204 in FIG. 4, with reference to FIGS. 14A, 14B, 14C and 15.

Figure 14A:
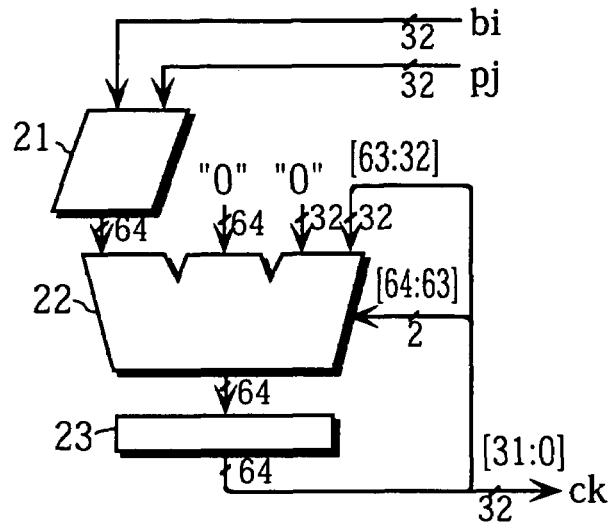
FIG. 14A shows the operating state and input data for the arithmetic unit when partial products with a same digit position are computed and accumulated for a first time in the first half of the processing (B×P) in the Montgomery calculation of step 2.
Figure 14B:
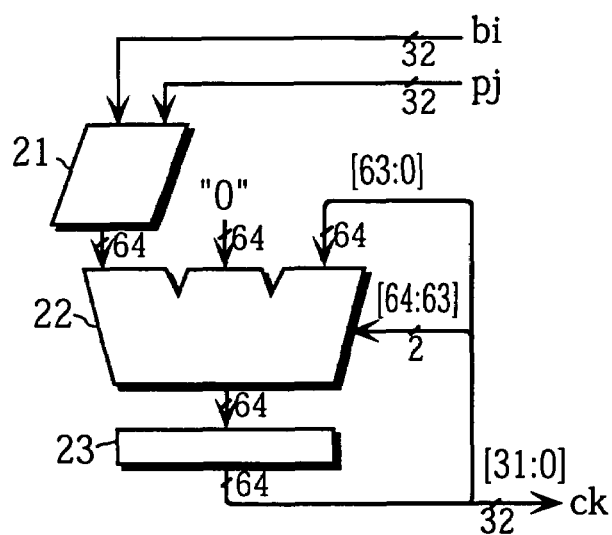
FIG. 14B shows the operating state and input data for the arithmetic unit when partial products with a same digit position are computed and accumulated for a second time onwards in the first half of the processing (B×P) in the Montgomery calculation of step 2.

FIGS. 14A and 14B show the operating state and input data for the arithmetic unit 20 when the first half of the processing (B×P) for step 2 of the Montgomery calculation is executed. The arithmetic unit 20 multiplies each word $b_i$ of the integer B obtained in step 1 with each word $p_j$ of the integer P, while accumulating the partial products with the same digit position obtained from this process and substituting the upper six words of the cumulative result into the integer C.

FIG. 14A shows the operating state of the arithmetic unit 20 when a first addition of a cumulative value for partial products with the same digit position is performed. FIG. 14B shows the operating state of the arithmetic unit 20 when addition of cumulative values for partial products with a same digit position is performed for the second time onwards.

Figure 14C:
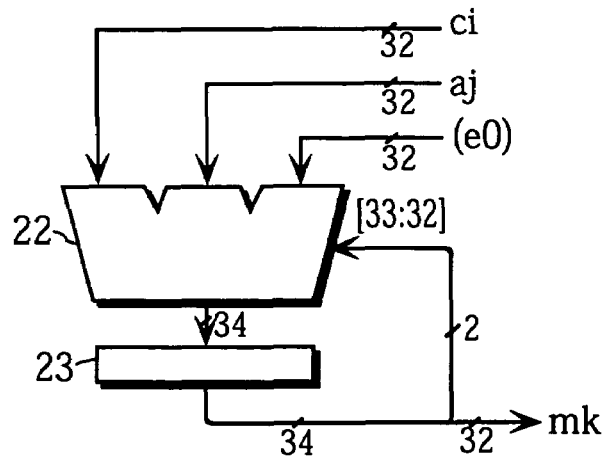
FIG. 14C shows the operating state and input data for the arithmetic unit when the second half of the processing (B×P) in the Montgomery calculation of step 2 (adding A to the processing result of the first half of the processing B×P) is executed.

FIG. 14C shows the operating state and the input data for the arithmetic unit 20 when the second half of the processing (addition of the result of the first half of the processing B×P and integer A) in step 2 of the Montgomery calculation is executed. The arithmetic unit 20 adds the integer C obtained from the first half processing, the one-word fixed integer E and the upper six words of the integer A, and substitutes the upper five words of this addition result into the integer M.

Figure 15:
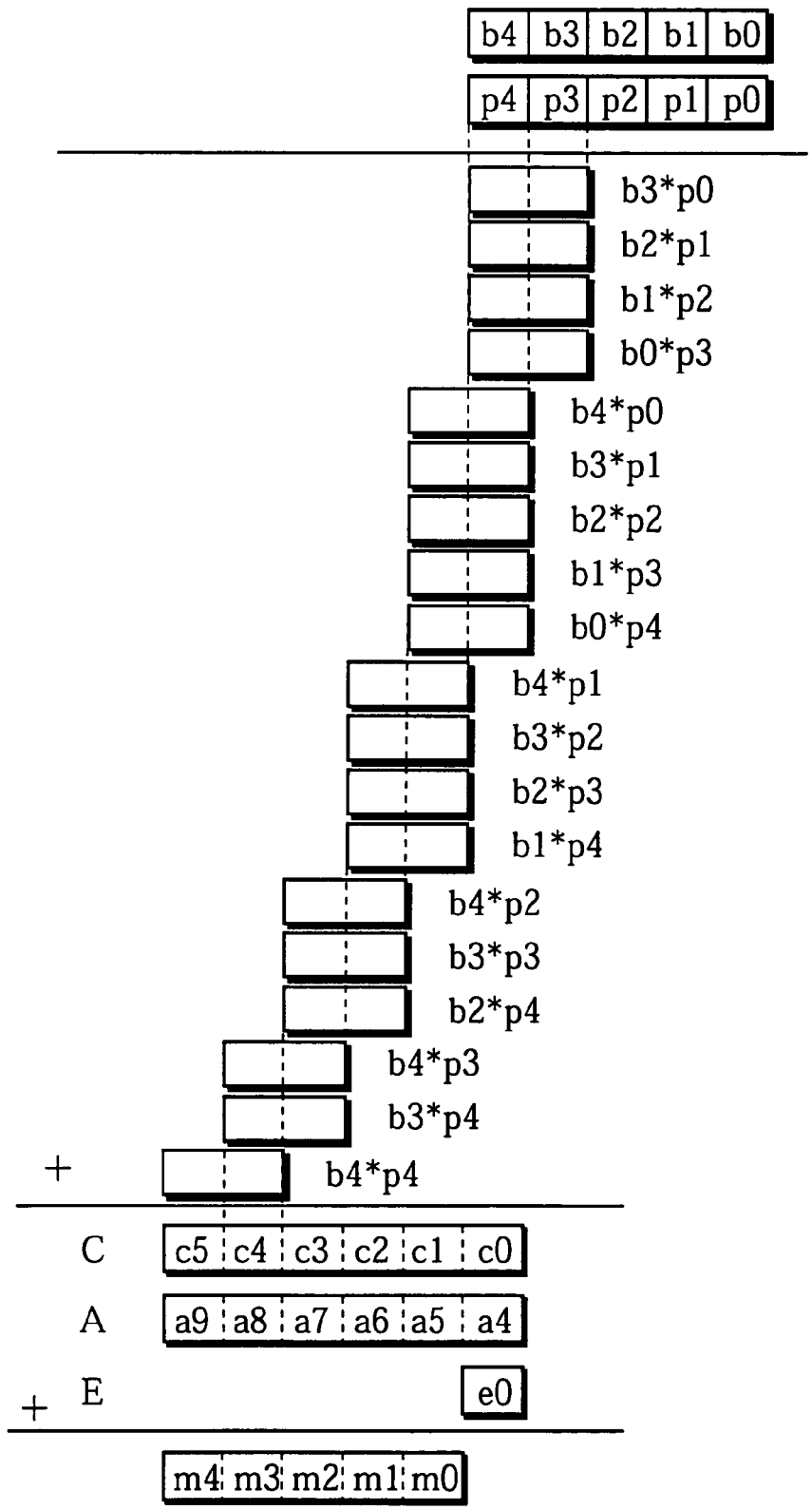
FIG. 15 shows a calculating procedure when the arithmetic unit executes the Montgomery calculation in step 2.

FIG. 15 shows the calculating procedure when step 2 of the Montgomery calculation is executed by the arithmetic unit 20. The upper part of the drawing shows the integer B [$b_4$, $b_3$, $b_2$, $b_1$, $b_0$] and the integer P [$p_4$, $p_3$, $p_2$, $p_1$, $p_0$] on which multiplication for the first half of the processing is performed. Partial products are arranged in order of calculation from top to bottom in the central part of the drawing. The lower part of the drawing is a representation of a process in which an upper six words of cumulative results for partial products with the same digit position are substituted into each word of an integer C [$c_5$, $c_4$, $c_3$, $c_2$, $c_1$, $c_0$] and the integer C, the integer E and the upper six words of the integer A are added, the result of the addition being substituted into the upper five words of the integer M.

Note that the reason for storing only the upper five words from the result of the above multiplication and addition (B×P+A) in the integer M is that the relation B×P+A mod R=0, makes it clear that the lower half of the calculation result (B×P+A), i.e. the lower five words, must be all zeros.

Therefore, in step 2, the required calculation is executed focusing only on the upper five words of the calculation result. However, since a carry from the sixth word (the sixth from the most significant digit, other words referred to below also being so defined) to the fifth word is considered when computing (B×P+A), the multiplication of integers B and P and the addition of integer A are performed on the upper six words of the integer.

Furthermore, a word containing all ones is also added when performing additions for the sixth word. This enables any carry propagated to the fifth word from the seventh word via the sixth word to be considered when computing (B×P+A). Since it has been ascertained, as described above, that the sixth word for the calculation (B×P+A) must be '0', the carry from the seventh word only needs to be considered if the result of adding the data $c_0$ and the data $a_4$ not '0'. If the result of adding the data $c_0$ and the data $a_4$ is '0', there is no need to check for a carry, as any carry can be propagated simply by adding the integer E ($e_0$).

Note that incorporating the addition of the data $e_0$, having ones in all its bit positions, in the addition of the data $c_0$ and the data $a_4$ is equivalent to performing one of the following processing (1) to (4).

(1) When the addition result of data $c_0$ and data $a_4$ is '0', and the carry is also '0', a carry '0' is added to the computed data $m_0$ ($c_1+a_5$).

(2) When the addition result of data $c_0$ and data $a_4$ is '0', but the carry is '1', a carry '1' is added to the computed data $m_0$ ($c_1+a_5$).

(3) When the addition result of data $c_0$ and data $a_4$ is not '0', but the carry is '0', a carry '1' is added to the computed data $m_0$ ($c_1+a_5$).

(4) When the addition result of data $c_0$ and data $a_4$ is not '0', and the carry is '1', a carry '2' is added to the computed data $m_0$ ($c_1+a_5$).

The following is an explanation of the actual operation performed by the arithmetic unit 20 in step 2.

In a first clock cycle, after being put in the operating state shown in FIG. 14A by a control signal transmitted from the control unit 10, the arithmetic unit 20 uses the multiplier 21 to multiply two pieces of data $b_3$ and $p_0$, transmitted via the memory input/output unit 30 from the second memory 42 and the first memory 41 respectively, and stores the multiplication result in the register 23.

In a second clock cycle, after being put in the operating state shown in FIG. 14B by a control signal transmitted from the control unit 10, the arithmetic unit 20 uses the multiplier 21 to multiply two pieces of data $b_2$ and $p_1$, transmitted from the second memory 42 and the first memory 41 respectively, accumulates the obtained multiplication value with the value stored in the register 23 in the first cycle and stores the cumulative result in the register 23.

Subsequently, the arithmetic unit 20 computes partial products (with the same digit position) for all combinations of $b_1$ and $p_j$ where the sum of and is 3, and accumulates the partial products (third and fourth clock cycles).

In a fifth clock cycle, after being put in the operating state shown in FIG. 14A by a control signal transmitted from the control unit 10, the arithmetic unit 20 uses the multiplier 21 to multiply two pieces of data $b_4$ and $p_0$ transmitted via the memory input/output unit 30 from the second memory 42 and the first memory 41 respectively, adds the multiplication result and a value obtained by downshifting the value held in the register 23 by one word, and stores the result in the register 23. Simultaneously, the arithmetic unit 20 writes a lower word from the result of the multiplication and accumulation from the fourth cycle held in the register 23 in a storage area $c_0$ in the second memory 42.

In a sixth clock cycle, after being put in the operating state shown in FIG. 14B by a control signal transmitted from the control unit 10, the arithmetic unit 20 uses the multiplier 21 to multiply two pieces of data $b_3$ and $p_1$, transmitted from the second memory 42 and the first memory 41 respectively, accumulates the obtained multiplication value with the value stored in the register 23 and stores the cumulative result in the register 23.

Subsequently, the arithmetic unit 20 computes partial products for all combinations of $b_i$ and $p_j$ where the sum of $_i$ and $_j$ is from 4 to 8, accumulates the partial products, and stores the results in the storage areas $c_1$, $c_2$, $c_3$, $c_4$ and $c_5$. Next, after being put in the operating state shown in FIG. 14C by a control signal transmitted from the control unit 10, the arithmetic unit 20 arranges the digits in integers C [$c_5$, $c_4$, $c_3$, $c_2$, $c_1$, $c_0$] and E [-, -, -, -, -, $e_0$] transmitted from the second memory 42 and integer A [$a_9$, $a_8$, $a_7$, $a_6$, $a_5$, $a_4$] into words, and performs addition of corresponding words from each of the integers, substituting each of the results into an integer M [$m_4$, $m_3$, $m_2$, $m_1$, $m_0$, -] in a first memory 41.

This means that the arithmetic unit 20 adds the pieces of data $c_0$ and $a_4$ during the first clock cycle, adds the piece of data $c_1$, the piece of data $a_5$ and a carry, and substitutes this result into data $m_0$ during the second clock cycle, and adds the piece of data $c_2$, the piece of data $a_6$ and a carry, and substitutes this result into data $m_1$ in a third clock cycle. Subsequent processing is performed in a similar manner.

This completes the processing for step 2. Note, that in step 2, calculation for partial products of integers B and P is not performed for partial products having complements whose sum is less than 2, for example $b_0*p_0$, and $b_1*p_0$. This means that the processing time required to compute partial products in this invention is less than that for conventional processing in which all of the partial products are multiplied.

Step 3

The following is a detailed explanation of the operations performed by the multi-word arithmetic device 100 in step 3 of the Montgomery calculation, in other words the processing in step S205 in FIG. 4.

Figure 16A:
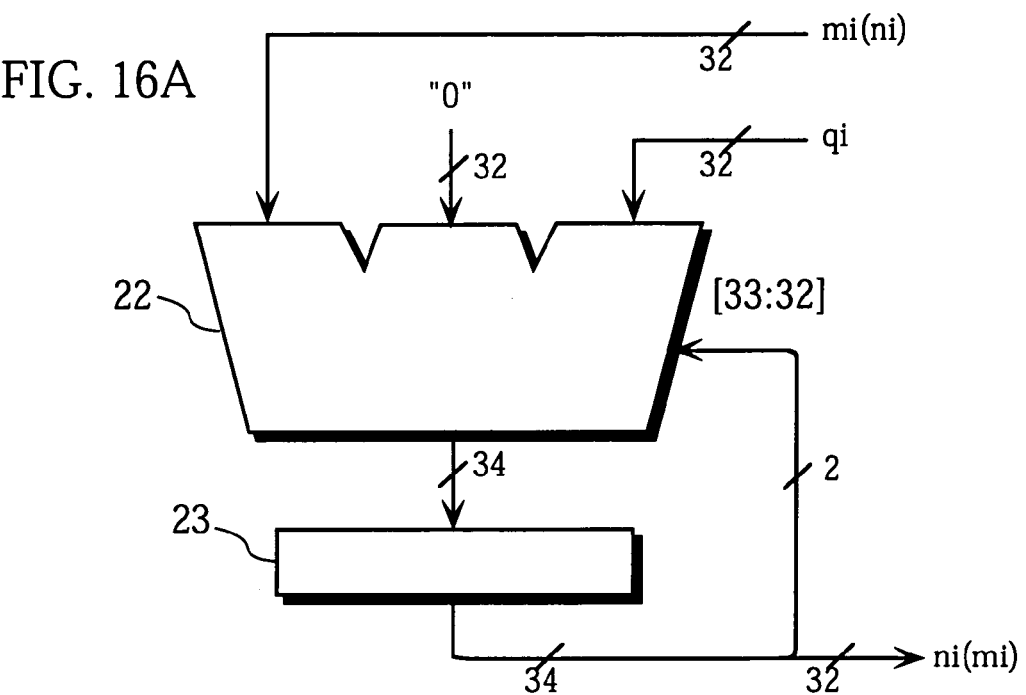
FIG. 16A shows the operating state and input data for the arithmetic unit when the first half of the processing for the Montgomery calculation in step 3 (M+Q or N+Q) is performed.
Figure 16B:
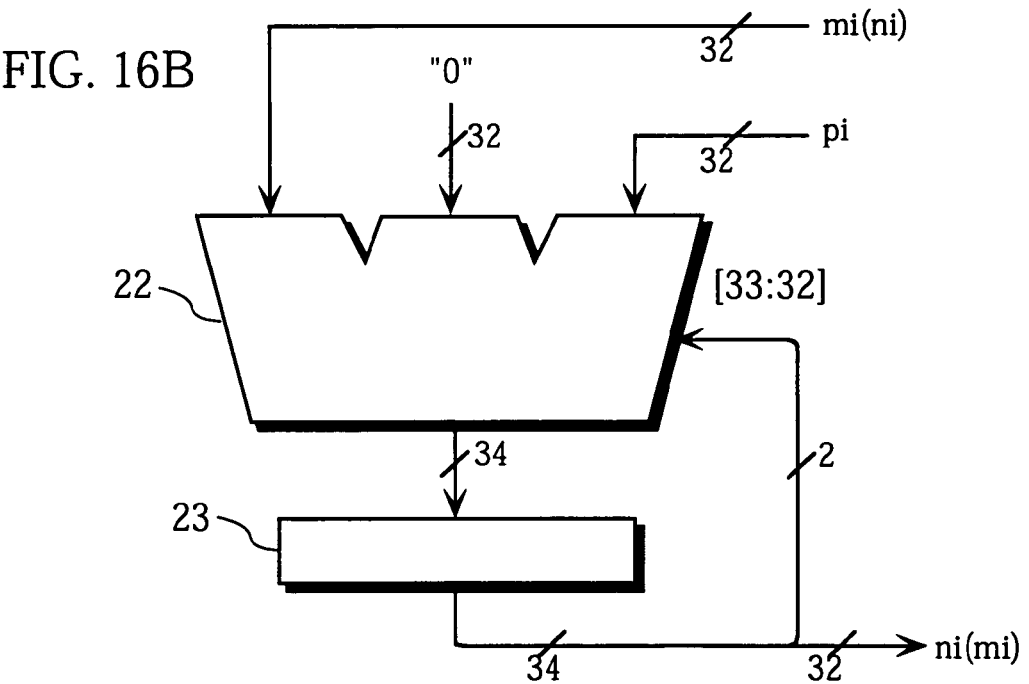
FIG. 16B shows the operating state and input data for the arithmetic unit when the second half of processing for the Montgomery calculation in step 3 (M+P or N+P) is performed.

FIGS. 16A and 16B show operating states and input data for the arithmetic unit 20 when step 3 of the Montgomery calculation is performed. The arithmetic unit 20 uses the first memory 41 (integer M) and the second memory 42 (integer N) alternately as temporary working areas (buffers), and computes a residue of the integer M obtained in step 2 modulo an integer P (M mod P), storing the result in integer M or integer N.

FIG. 16A shows the operating state of the arithmetic unit 20 when the first half of processing for step 3 is performed. In this first half, the arithmetic unit 20 alternates (i) addition of integer M and integer Q (=−P), and substitution of the result into integer N, and (ii) addition of integer N and integer Q and substitution of the result into integer M, until an obtained integer M (or N) is negative.

FIG. 16B shows the operating state of the arithmetic unit 20 when the second half of processing for step 3 is performed. The arithmetic unit 20 adds the negative integer M (or N) obtained in the first half to integer P, and substitutes the result into the integer N (or M).

The following is an explanation of the actual processing performed by the arithmetic unit 20 in step 3.

In a first clock cycle, after being put in the operating state shown in FIG. 16A by a control signal transmitted from the control unit 10, the arithmetic unit 20 adds two pieces of data $m_0$ and $q_0$, transmitted via the memory input/output unit 30 from the first memory 41, and stores the addition result in the register 23.

In a second clock cycle, the arithmetic unit 20 adds two pieces of data $m_1$ and $q_1$, transmitted from the first memory 41, and stores the result of the addition in the register 23, whilst simultaneously storing a lower word from a value held in the register 23 from the first cycle in a storage area $n_0$ in the second memory 42.

Repetition of addition and storage in this way changes the value of integer N in the second memory 42 to M+Q, in other words M−P.

Next, the control unit 10 determines the code of the most-recently stored integer N, by receiving a carry generated from the last calculation performed in the above described addition from the memory input/output unit 30. If integer N is determined to be positive, each word of integer N is added to each word of integer Q and the result substituted into integer M, and the control unit 10 determines the code of this integer M. The two types of addition above (M+Q→N, N+Q→M) are alternated until integer M (or N) is negative.

When a resulting integer M (or N) is negative, the control unit 10 transmits a control signal to the arithmetic unit 20 via the memory input/output unit 30, thereby setting the operating state of the arithmetic unit 20 to that shown in FIG. 16B. Then, the arithmetic unit 20 adds integer M (or N) and integer P, and substitutes the result into integer N (or M) by repeating addition and storage for each word, in the same way as in the first half.

Thus, the residue of integer M modulo integer P (M mod P), in other words the final result of the Montgomery calculation, is stored in the integer M in the first memory 41 or in the integer N in the second memory 42, completing step 3.

In this way, the multi-word arithmetic device 100 can execute two types of multi-word arithmetic, modular addition and Montgomery calculation, required for elliptic curve cryptology and the like, despite being provided with just one arithmetic unit 20.

Furthermore, the two-word multiplication and the three-word addition performed respectively by the multiplier 21 and the three-input adder 22, and the storing of a previous multiplication and addition result in the memory 40 can be executed in parallel as different stages in a pipeline. This enables multi-word arithmetic to be performed at high speed.

The multi-word arithmetic device 100 of the present invention has been described based on the embodiment, but the limitations set out thus far need not apply.

For example, the multi-word arithmetic device 100 in this invention performs multi-word arithmetic on five-word integers, and the arithmetic unit 20 uses 32-bit word units, but the invention need not be limited to these numerical values.

Furthermore, the multi-word arithmetic device 100 subtracts a modulus P from a given integer by using a method which involves adding an integer Q (=−P) already obtained from an external device, but a method in which the modulus P is subtracted directly may be used.

Figure 17:
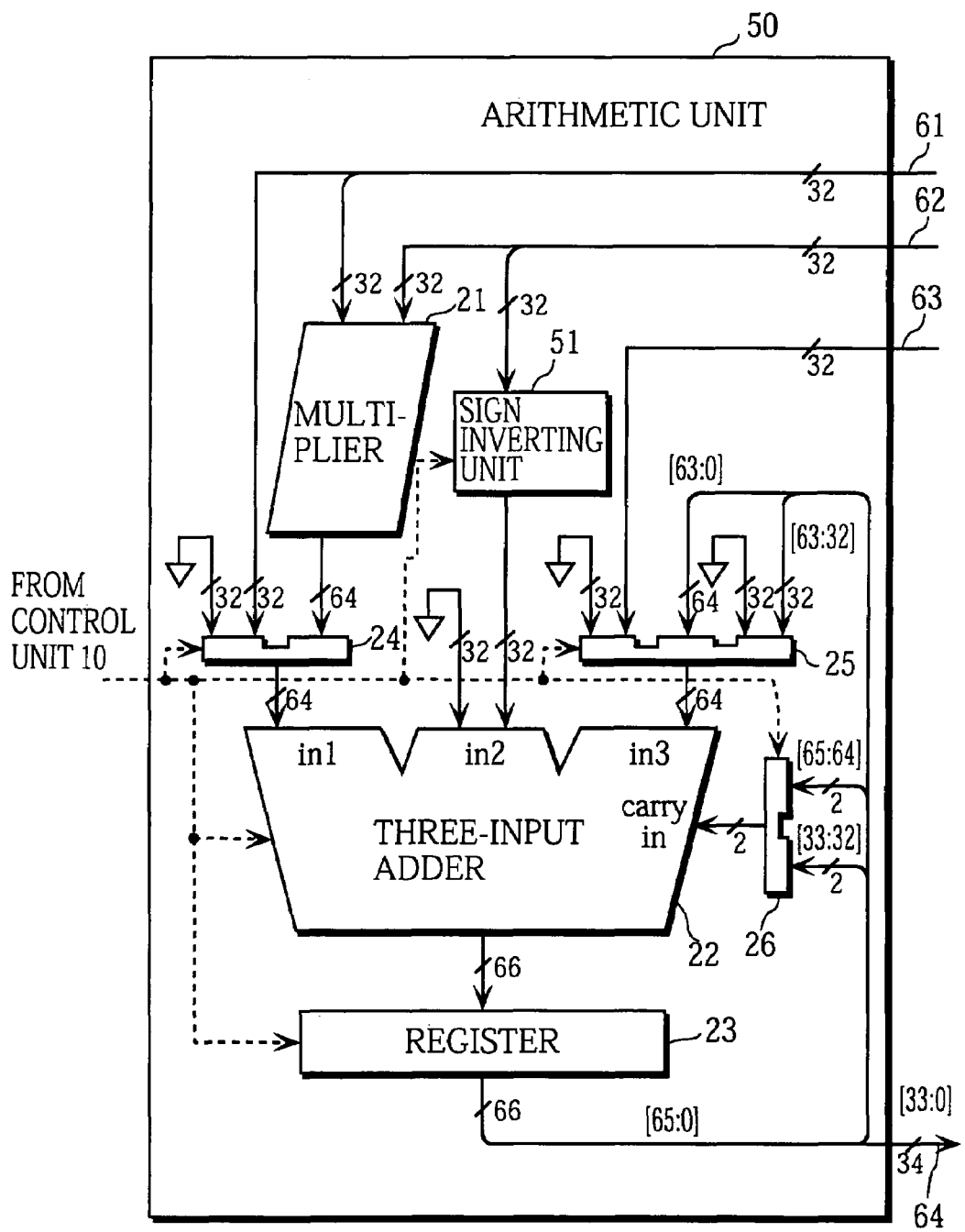
FIG. 17 is a circuit showing a construction for an arithmetic unit in an alternative embodiment having a subtract function.
Figure 18A:
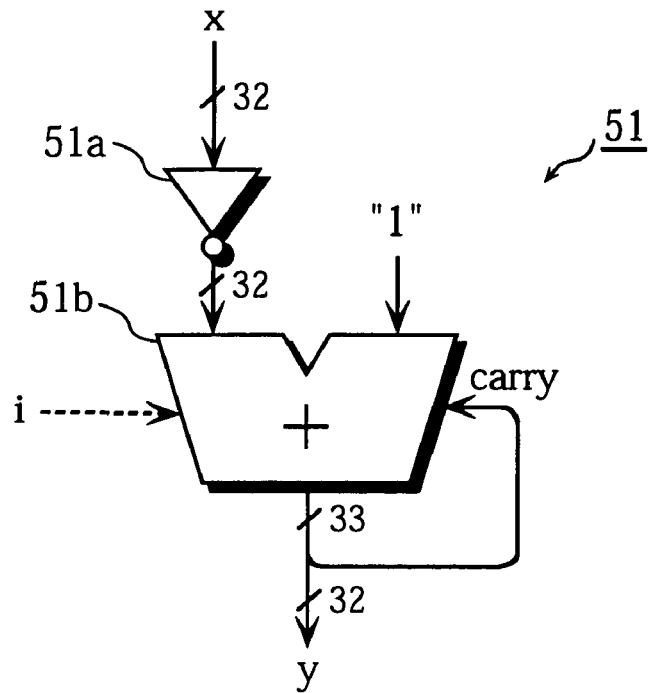
FIG. 18A shows a circuit construction for a sign inverter in an arithmetic unit of an alternative embodiment.
Figure 18B:
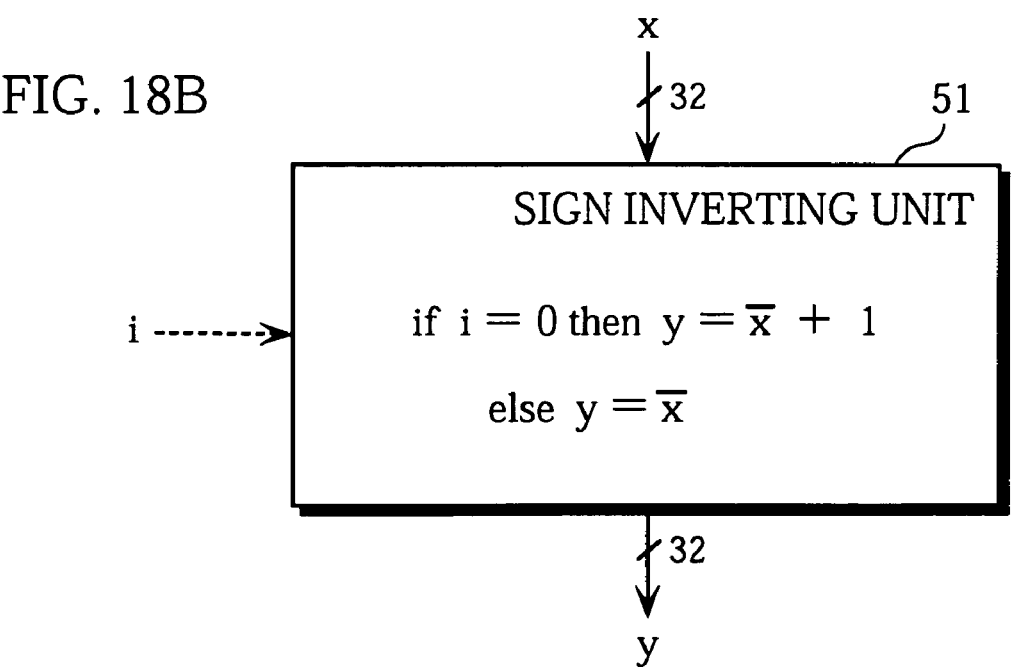
FIG. 18B shows operations performed by the sign inverter in the arithmetic unit in the alternative embodiment.

FIG. 17 is a circuit showing a construction of an arithmetic unit 50 in a modification of the invention enabling the modulus P to be subtracted directly. The arithmetic unit 50 has a similar construction to the arithmetic unit 20 in the embodiment, into which a sign inverting unit 51 has been inserted immediately prior to the second input port $in_2$ of the three-input adder 22. The sign inverting unit 51 is capable of inverting signs for n-word integers, and has a circuit construction and operating function shown respectively in FIGS. 18A and 18B. This means that, when a least significant word for an n-word integer is input, the sign inverting unit 51 inverts each bit of the word and then adds '1' to the result before outputting it. When a higher word is input, the sign inverting unit 51 inverts each bit of the word and outputs it.

Inputting each word of integer P consecutively into such a sign inverting unit 51 has the same effect as inputting each word of integer Q (=−P) consecutively into the second input port $in_2$ of the three-input adder 22. As a result, using this arithmetic unit 50 instead of the arithmetic unit 20 makes the processing in which integer Q is generated beforehand by an external device and passed to the multi-word arithmetic device 100 unnecessary.

Furthermore, the multi-word arithmetic device 100 includes a memory input/output unit 30 for transferring data between the arithmetic unit 20 and the memory 40 and between an external device and the memory 40, but the invention need not have such a limitation. These two types of data transfer may be performed by an external device and another data transfer circuit or similar, rather than by including the memory input/output unit 30 in the multi-word arithmetic device 100. Alternatively, the two types of data transfer may be performed by separate circuits, included in each of the arithmetic unit 20 and the memory 40.

Here, first and second memories 41 and 42 are each dual-port memories on which two separate accesses can be performed during one clock cycle. Alternatively, single-port memories operated by a clock signal provided at double the frequency may be used.

The multi-word arithmetic device 100, in step 2 of the Montgomery calculation, adds six-word intermediate data C, the upper five words of the integer A and the one-word integer E, computing the five-word integer M. Alternatively, an integer AA may be taken as the upper (n+1) words of the integer A, and the following four values added:

(i) a carry generated when the least significant word of each of intermediate data C and integer AA are added together;
(ii) a 1-bit logical value that is '0' when the result of the addition (i) is '0' and '1' when the result is not '0';
(iii) the upper n words of the intermediate data C; and
(iv) the upper n words of the integer AA.

This enables the multi-word arithmetic device 100 to complete step 2 of the Montgomery calculation without needing to obtain integer E from an external device.

Furthermore, the multi-word arithmetic device 100 completes step 3 of the Montgomery calculation by storing a final result in one of the first memory 41 (integer M) and the second memory 42 (integer N). Alternatively, a processing similar to the third process in the modular addition may be added, so that an integer N in which the final result is stored is transferred to integer M. This ensures that the final result of the Montgomery calculation will be stored in the integer M.

In the arithmetic unit 20, multiplication by the multiplier 21 and accumulation by the three-input adder 22 are described as being performed during the same clock cycle, but a register may be provided between the multiplier 21 and the three-input adder 22, so that multiplication and addition are performed during two clock cycles. In other words, the pipeline of the arithmetic unit 20 may be divided into three stages (multiplication, addition, and writing into the memory 40). This reduces the maximum burden generated by the pipeline processing during a single clock cycle, and shortens its critical path, enabling the operating frequency of the arithmetic unit 20 to be raised.

When performing Montgomery calculation in the embodiment, the multi-word arithmetic device 100 selects sets of word pairs, each set formed from all the pairs of words that generate a partial product with a same digit position, sets input values in the multiplier, and adds the result of a multiplication to an accumulated value stored in the register 23. Alternatively, however, the result of the multiplication may be added to an accumulated partial product value via the memory 40.

In this case, the memory 40 is already provided with an area for storing an accumulated value. The multi-word arithmetic device 100 may update accumulated values by (a) calculating a partial product, while simultaneously reading a one-word accumulated value from the memory 40, (b) adding the one-word accumulated value to a corresponding word in the partial product, and (c) storing the addition result in the corresponding area in the memory 40. This enables selection of the pairs of data to be multiplied to be performed with greater flexibility.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A multi-word arithmetic device for executing modular arithmetic on multi-word integers, in accordance with instructions from an external device, the multi-word arithmetic device comprising:

a memory;

an arithmetic unit for executing, on word units, at least two types of word calculations, including addition and multiplication, and outputting a one-word calculation result;

a memory input/output circuit for performing (1) a first data transfer for storing in the memory at least one integer received from an external device, (2) a second data transfer for inputting at least one integer stored in the memory into the arithmetic unit in word units, (3) a third data transfer for storing in the memory the calculation result output from the arithmetic unit, and (4) a fourth data transfer for outputting the calculation result from the memory to the external device; and a control circuit for, according to instructions received from the external device, (a) specifying, to the memory input/output unit, data to be transferred by the second and third data transfers, and
(b) specifying, to the arithmetic unit, a type of word calculation to be executed, thereby controlling:

(i) the arithmetic unit to selectively perform one of at least two types of modular arithmetic on the at least one integer stored in the memory; and
(ii) the memory input/output circuit to store the calculation result of the modular arithmetic into the memory, wherein the selected modular arithmetic includes a plurality of word calculations, each word calculation for a different word of the at least one integer;

when the selected modular arithmetic is performed, the control circuit repeatedly instructs, for each word of the at least one integer, the arithmetic unit to perform the word calculation, wherein the at least two types of modular arithmetic include Montgomery reduction calculating a residue for $A \cdot R^{\wedge}(-1) \mod P$, when each word has k bits, A is a 2n-word integer used for input data, R is an integer $2^{\wedge}(k \times n)$ and P is an n-word integer; and upon receiving, from the external device, an instruction to execute Montgomery reduction and an indication of a number of words 2n for an integer A on which Montgomery reduction is to be performed, the control circuit controls the memory input/output circuit and the arithmetic unit to execute Montgomery reduction, wherein, when receiving an instruction to execute Montgomery reduction from the external device, the control circuit controls the memory input/output circuit and the arithmetic unit so as to execute the following processing:

(1) the memory input/output circuit acquires integers A, P and V from the external device and stores the obtained integers in the memory, the integer V being $-P^{\wedge}(-1) \mod R$;

(2) the arithmetic unit computes partial products for words from each of (i) a lower n words of the integer A stored in the memory, and (ii) the integer V, and accumulates words in partial products having a same digit position, repeating the process sequentially from a lowest word in each integer until n words of accumulated results are obtained, and storing the accumulated results in the memory as a piece of n-word intermediate data B;

(3) the arithmetic unit computes partial products for words from each of (a) the piece of intermediate data B and (b) the integer P stored in the memory, and accumulates words in the partial products having a same digit position so that, when a lowest word is a 0 th word, accumulated results for a 0 th to (n−3)th word are not obtained, but accumulated results for a (n−2)th word to a (2n−1)th word are obtained and stored in the memory as the upper (n+1) words of a piece of intermediate data D;

(4) the arithmetic unit (a) generates (i) a carry obtained from a one-word addition performed by adding a lowest word from each of the piece of intermediate data 0 and an integer AA, and (ii) a one-bit logical value, the integer AA being an upper (n+1) words of the integer A, and the one-bit logical value being 0 when a one-word addition result is 0, and 1 when the one-word addition result is not 0, and (b) adds an upper n words of the piece of intermediate data D, an upper n words of the integer AA, the carry and the one-bit logical value, by repeating addition of word units sequentially from a lowest word in each integer, while propagating a carry, until n words of data are obtained, and stores an addition result in the memory as a piece of n-word output data M; and (5) when the output data M stored in the memory is at least as large as the integer P, the arithmetic unit subtracts the integer P from the output data M until the output data M is 0 or a positive integer smaller than the integer P, by repeating subtraction of word units sequentially from a lowest word in each integer, while propagating a carry, until n words of data are obtained, and stores the subtraction results in the memory as a new piece of n-word output data M, wherein in processing (4), the arithmetic unit adds a piece of one word data containing all ones to the piece of intermediate data D and the integer AA, and stores an upper n words of an obtained addition result in the memory as the output data M.

2. The multi-word arithmetic device of claim 1 wherein, in processing (2) and (3), the arithmetic unit selects sets of word pairs, each set formed from all the pairs of words that generate a partial product with a same digit position, sets input values in the multiplier, and computes and accumulates the partial products for the selected pairs of words in sequence from the set with a lowest digit position.

3. The multi-word arithmetic device of claim 2, wherein, in processing (2) and (3), the arithmetic unit stores in the memory as part of a multiplication result a lower word from a two-word accumulated result obtained by accumulating partial products with the same digit position, and adds an upper word from the accumulated result to partial products that have a digit position one word higher and are thus the next to be calculated.

4. The multi-word arithmetic device of claim 3, wherein the arithmetic unit performs an operation for storing a lower word from the accumulated result in the memory simultaneously with an operation for adding an upper word from the accumulated result to partial products that have a digit position one word higher and are thus the next to be calculated.

5. The multi-word arithmetic device of claim 1 wherein, when computing and accumulating partial products in processing (2) and (3), the arithmetic unit updates accumulated values by (a) simultaneously (i) computing a partial product and (ii) reading a previously accumulated one-word value from the memory, (b) adding the accumulated one-word value to a corresponding word in the partial product, and (c) storing a result of the addition in a corresponding area of the memory.

* * * * *